US010034301B2

(12) United States Patent
Kowalski et al.

(10) Patent No.: US 10,034,301 B2
(45) Date of Patent: Jul. 24, 2018

(54) SCHEDULING WIRELESS DEVICE-TO-DEVICE COMMUNICATIONS

(71) Applicant: Sharp Laboratories of America, Inc., Camas, WA (US)

(72) Inventors: John Michael Kowalski, Camas, WA (US); Shohei Yamada, Camas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 99 days.

(21) Appl. No.: 14/660,528

(22) Filed: Mar. 17, 2015

(65) Prior Publication Data
US 2015/0271846 A1    Sep. 24, 2015

Related U.S. Application Data

(60) Provisional application No. 61/955,019, filed on Mar. 18, 2014.

(51) Int. Cl.
*H04W 72/14* (2009.01)
*H04W 76/14* (2018.01)
(Continued)

(52) U.S. Cl.
CPC ........... *H04W 72/14* (2013.01); *H04W 76/14* (2018.02); *H04W 28/18* (2013.01);
(Continued)

(58) Field of Classification Search
CPC .... H04L 5/0035; H04L 5/0037; H04W 28/18; H04W 72/042; H04W 72/044;
(Continued)

(56) References Cited

U.S. PATENT DOCUMENTS 9,332,512 B2    5/2016 Sebire
9,445,316 B2    9/2016 Lu
(Continued)

FOREIGN PATENT DOCUMENTS

WO    WO 2013/109100 A1    7/2013
WO    2013/171115 A1    11/2013
(Continued)

OTHER PUBLICATIONS

RP-140126, 3GPP TSG-RAN WG #63, Fukuoka, Japan, Mar. 3-6, 2014, "Cover Sheet for TR 36.843 v1.2.0 on Study of LTE Device to Device Proximity Services; Radio Aspects", Qualcomm Incorporated (Rapporteur).
(Continued)

*Primary Examiner* — Jamal Javaid
*Assistant Examiner* — Rose Clark
(74) *Attorney, Agent, or Firm* — Nixon & Vanderhye P.C.

(57) ABSTRACT

A radio access node (22) which communicates over a radio interface (24) with a first wireless terminal ($26_1$). The radio access node (22) generates a device-to-device (D2D) grant (54) which specifies radio resources that the first wireless terminal ($26_1$) is permitted to use for device-to-device (D2D) communication with a second wireless terminal (second wireless terminal $26_2$). The radio access node (22) transmits the subframe (S) including the D2D grant (54) to the first wireless terminal ($26_1$). The first wireless terminal ($26_1$) transmits data (56) to the second wireless terminal using radio resources permitted by the D2D grant. In an example embodiment and mode the D2D grant is included in a downlink control channel such as PDCCH; in another example embodiment and mode the D2D grant is included in a downlink shared channel (PDSCH).

21 Claims, 13 Drawing Sheets

(51) Int. Cl.
- H04W 28/18 (2009.01)
- H04W 72/04 (2009.01)
- H04W 72/12 (2009.01)
- H04W 92/18 (2009.01)

(52) U.S. Cl.
CPC ...... H04W 72/042 (2013.01); H04W 72/1289 (2013.01); H04W 92/18 (2013.01)

(58) Field of Classification Search
CPC ........... H04W 72/0453; H04W 72/048; H04W 72/1289; H04W 72/1294; H04W 72/14; H04W 76/023; H04W 92/18
See application file for complete search history.

(56) References Cited

U.S. PATENT DOCUMENTS

| | | |
|---|---|---|
| 2003/0061390 A1 | 3/2003 | Schaller et al. |
| 2007/0115884 A1 | 5/2007 | Shang |
| 2011/0092204 A1 | 4/2011 | Iwamura et al. |
| 2011/0182280 A1 | 7/2011 | Charbit et al. |
| 2011/0255509 A1 | 10/2011 | Huang |
| 2012/0122463 A1 | 5/2012 | Chen |
| 2012/0129540 A1* | 5/2012 | Hakola .............. H04W 72/042 455/450 |
| 2013/0051277 A1 | 2/2013 | Hakola et al. |
| 2013/0070615 A1 | 3/2013 | Lennartson et al. |
| 2013/0102314 A1 | 4/2013 | Koskela |
| 2013/0109301 A1 | 5/2013 | Hakola et al. |
| 2013/0148637 A1 | 6/2013 | Yang et al. |
| 2013/0155962 A1 | 6/2013 | Hakola et al. |
| 2013/0188546 A1 | 7/2013 | Turtinen et al. |
| 2013/0195026 A1 | 8/2013 | Johnsson et al. |
| 2013/0208697 A1 | 8/2013 | Hwang et al. |
| 2013/0223356 A1 | 8/2013 | Khoshnevis et al. |
| 2013/0230015 A1 | 9/2013 | Hoymann et al. |
| 2013/0288668 A1 | 10/2013 | Pragada et al. |
| 2013/0308490 A1 | 11/2013 | Lim |
| 2013/0322276 A1 | 12/2013 | Pelletier et al. |
| 2013/0322413 A1 | 12/2013 | Pelletier et al. |
| 2013/0324114 A1 | 12/2013 | Raghothaman et al. |
| 2013/0331054 A1 | 12/2013 | Kodali |
| 2014/0004867 A1* | 1/2014 | Noh .................. H04W 76/023 455/450 |
| 2014/0010172 A1 | 1/2014 | Wei et al. |
| 2014/0056220 A1 | 2/2014 | Poitau et al. |
| 2014/0086176 A1 | 3/2014 | Liu |
| 2014/0098761 A1 | 4/2014 | Lee |
| 2014/0106757 A1 | 4/2014 | Hakola |
| 2014/0128078 A1 | 5/2014 | Zhu et al. |
| 2014/0148177 A1* | 5/2014 | Ratasuk .............. H04W 72/02 455/450 |
| 2014/0153417 A1 | 6/2014 | Gupta et al. |
| 2014/0169346 A1 | 6/2014 | Futaki |
| 2014/0185530 A1* | 7/2014 | Kuchibhotla ....... H04W 76/023 370/329 |
| 2014/0187283 A1* | 7/2014 | Nimbalker .......... H04W 72/048 455/550.1 |
| 2014/0213221 A1 | 7/2014 | Chai |
| 2014/0233528 A1 | 8/2014 | Webb |
| 2014/0269419 A1* | 9/2014 | Han ...................... H04W 56/00 370/254 |
| 2014/0274066 A1 | 9/2014 | Fodor |
| 2014/0314057 A1 | 10/2014 | Van Phan et al. |
| 2014/0328329 A1 | 11/2014 | Novlan |
| 2014/0342747 A1 | 11/2014 | Lee et al. |
| 2015/0043448 A1* | 2/2015 | Chatterjee .............. H04W 8/005 370/329 |
| 2015/0071207 A1* | 3/2015 | Seo .................... H04W 76/023 370/329 |
| 2015/0078279 A1* | 3/2015 | Ko ........................ H04L 1/1861 370/329 |
| 2015/0139006 A1 | 5/2015 | Seo |
| 2015/0146687 A1 | 5/2015 | Kim |
| 2015/0208453 A1* | 7/2015 | Yamazaki ............. H04W 8/005 370/329 |
| 2015/0215767 A1 | 7/2015 | Siomina |
| 2015/0215881 A1 | 7/2015 | Parkvall |
| 2015/0215903 A1 | 7/2015 | Zhao et al. |
| 2015/0215977 A1* | 7/2015 | Yamazaki ............... H04W 4/08 455/452.1 |
| 2015/0215981 A1 | 7/2015 | Patil |
| 2015/0223184 A1 | 8/2015 | Bergstrom |
| 2015/0245193 A1 | 8/2015 | Xiong |
| 2015/0245307 A1 | 8/2015 | Chen |
| 2015/0257153 A1* | 9/2015 | Yamazaki ........... H04W 72/042 370/329 |
| 2015/0264588 A1 | 9/2015 | Li |
| 2015/0264733 A1 | 9/2015 | Guo |
| 2015/0271720 A1 | 9/2015 | Yamada et al. |
| 2015/0271807 A1* | 9/2015 | Patil .................... H04W 76/023 455/426.1 |
| 2015/0271841 A1 | 9/2015 | Yamada et al. |
| 2015/0304919 A1 | 10/2015 | Jung |
| 2015/0312821 A1* | 10/2015 | Yamazaki ........... H04W 76/023 370/338 |
| 2015/0312923 A1 | 10/2015 | Guo |
| 2015/0319797 A1 | 11/2015 | Yamada et al. |
| 2015/0327047 A1* | 11/2015 | Tiirola .................. H04W 8/005 370/338 |
| 2015/0327240 A1 | 11/2015 | Yamada et al. |
| 2015/0334669 A1 | 11/2015 | Zhang |
| 2016/0021594 A1 | 1/2016 | Yilmaz |
| 2016/0044618 A1 | 2/2016 | Sheng et al. |
| 2016/0081073 A1* | 3/2016 | Lindoff ............. H04W 72/1257 370/329 |
| 2016/0094975 A1 | 3/2016 | Sheng |
| 2016/0100401 A1 | 4/2016 | Xiong |
| 2016/0112172 A1 | 4/2016 | Seo |
| 2016/0127970 A1 | 5/2016 | Chuang |
| 2016/0143078 A1 | 5/2016 | Jeong |
| 2016/0183076 A1* | 6/2016 | Bagayoko ........... H04W 76/023 370/329 |
| 2016/0192269 A1 | 6/2016 | Kim |
| 2016/0192426 A1 | 6/2016 | Noh |
| 2016/0205534 A1 | 7/2016 | Fujishiro |
| 2016/0212665 A1 | 7/2016 | Fukuta |
| 2016/0212721 A1 | 7/2016 | Sheng |
| 2016/0219528 A1* | 7/2016 | Kawasaki ........... H04W 76/023 |
| 2016/0219566 A1 | 7/2016 | Jung |
| 2016/0219574 A1* | 7/2016 | Ribeiro ............. H04W 52/0216 |
| 2016/0262111 A1* | 9/2016 | Boudreau ............. H04W 76/02 |
| 2016/0269953 A1 | 9/2016 | Jung et al. |
| 2016/0278009 A1* | 9/2016 | Sorrentino ............ H04W 72/02 |
| 2016/0345307 A1 | 11/2016 | Huang et al. |
| 2016/0381630 A1 | 12/2016 | Krishnamoorthy |
| 2017/0006653 A1 | 1/2017 | Zeng |
| 2017/0071001 A1 | 3/2017 | Ahmadi |
| 2017/0164381 A1 | 6/2017 | Kim |

FOREIGN PATENT DOCUMENTS

| | | |
|---|---|---|
| WO | 2013/083197 A1 | 12/2013 |
| WO | 2015/063186 A1 | 5/2015 |

OTHER PUBLICATIONS

3GPP TR 36.843, v1.2.0, Technical Report, 3rd Generation Partnership Project, Technical Specification Group Radio Access Network; Study of LTE Device to Device Proximity Services; Radio Aspects (Release 12) (Feb. 2014).

3GPP TS 36.213 v12.0.0, Technical Specification, 3rd Generation Partnership Project; Technical Specification Group Radio Access Network; Evolved Universal Terrestrial Radio Access (E-UTRA); Physical Layer Procedures (Release 12) (Dec. 2013).

R1-150954, 3GPP TSG-RAN Meeting #80, Change Request, "Correction of Discovery Signal Transmission", Ericsson, Athens, Greece, Feb. 9-13, 2015.

R1-150959, 3GPP TSG-RAN WG1 Meeting #80, Change Request, "Introduction of D2D Feature into 36.212", Huawei, Athens, Greece, Feb. 9-13, 2015.

(56) References Cited

OTHER PUBLICATIONS

3GPP TS 36.212 v12.3.0, Technical Specification, 3rd Generation Partnership Project; Technical Specification Group Radio Access Network; Evolved Universal Terrestrial Radio Access (E-UTRA); Multiplexiing and Channel Coding (Release 12) (Dec. 2014).
3GPP TS 36.331 v12.4.0, Technical Specification, 3rd Generation Partnership Project; Technical Specification Group Radio Access Network; Evolved Universal Terrestrial Radio Access (E-UTRA); Radio Resource Control (RRC) Protocol Specification (Release 12) (Dec. 2014).
FiTS User's Manual for Business Partner, Nov. 19, 2013.
R2-144223, 3GPP TSG RAN WG2 Meeting #87bis, "Further Mode 2 Switching Rules in RLF Exceptional Case", Sharp, Shanghai, China, Oct. 6-10, 2014.
R1-150899, 3GPP TSG-RAN WG1 Meeting #80, Change Request, "Introduction of ProSe", Alcatel-Lucent, Athens, Greece, Feb. 9-13, 2015.
R1-150961, 3GPP TSG-RAN Meeting #80, Change Request, "Inclusion of ProSe", Ericsson, Athens, Greece, Feb. 9-13, 2015.
R1-150962, 3GPP TSG-RAN Meeting #80, Change Request, "Introduction of D2D (ProSe) Feature into 36.213", Editor (Motorola Mobility), Athens, Greece, Feb. 9-13, 2015.
R1-150252, 3GPP TSG-RAN Meeting #80, Change Request, "Inclusion of Measurement for ProSe", Ericsson, Athens, Greece, Feb. 9-13, 2015.
R2-150645, 3GPP TSG-RAN WG2 Meeting #89, Change Request, "Corrections to Stage 2 Description of ProSe", Intel Corporation, Fujitsu, InterDigital, Huawei, HiSilicon, ZTE, Athens, Greece, Feb. 9-13, 2015.
R2-150699, 3GPP TSGRAN WG2 #89, Change Request, "Introduction of ProSe", LG Electronics Inc., Samsung, ZTE, Athens, Greece, Feb. 9-13, 2015.
R2-150700, 3GPP TSGRAN WG2 #89, Change Request, "Introduction of ProSe", Qualcomm Inc., Athens, Greece, Feb. 9-13, 2015.
R2-150717, 3GPP TSGRAN WG2 #89, Change Request, "Introduction of ProSe", Ericsson, Athens, Greece, Feb. 9-13, 2015.
R2-150570, 3GPP TSGRAN WG2 #89, Change Request, "Introduction of ProSe Direct Communication", Qualcomm Incorporated, Samsung, Athens, Greece, Feb. 9-13, 2015.
R2-150571, 3GPP TSGRAN WG2 #89, Change Request, "Introduction of ProSe Direct Communication", Qualcomm Incorporated, Potevio, Athens, Greece, Feb. 9-13, 2015.
R2-150734, 3GPP TSG-RAN2 #89 Meeting, Change Request, "Introduction of ProSe", Samsung, Athens, Greece, Feb. 9-13, 2015.
RP-150366, TSG-RAN Meeting #67, "CRs to 36.201, 36.211, 36.212, 36.213 & 36.214 to Introduce D2D Feature", TSG RAN WG1, Shanghai, China, Mar. 9-12, 2015.
3GPP TS 36.201 v12.1.0, Technical Specification, 3rd Generation Partnership Project; Technical Specification Group Radio Access Network; Evolved Universal Terrestrial Radio Access (E-UTRA); LTE Physical Layer; General Description (Release 12) (Dec. 2014).
3GPP TS 36.211 v12.4.0, Technical Specification, 3rd Generation Partnership Project; Technical Specification Group Radio Access Network; Evolved Universal Terrestrial Radio Access (E-UTRA); Physical Channels and Modulation (Release 12) (Dec. 2014).
3GPP TS 36.300 v12.4.0, Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; State 2 (Release 12) (Dec. 2014).
3GPP TS 36.306 v12.3.0, Technical Specification, 3rd Generation Partnership Project; Technical Specification Group Radio Access Network; Evolved Universal Terrestrial Radio Access (E-UTRA); User Equipment (UE) Radio Access Capabilities (Release 12) (Dec. 2014).
3GPP TS 36.321 v12.4.0, Technical Specification, 3rd Generation Partnership Project; Technical Specification Group Radio Access Network; Evolved Universal Terrestrial Radio Access (E-UTRA); Medium Access Control (MAC) Protocol Specification (Release 12) (Dec. 2014).
3GPP TS 36.322 v12.1.0, Technical Specification, 3rd Generation Partnership Project; Technical Specification Group Radio Access Network; Evolved Universal Terrestrial Radio Access (E-UTRA); Radio Link Control (RLC) Protocol Specification (Release 12) (Sep. 2014).
3GPP TS 36.323 v12.2.0, Technical Specification, 3rd Generation Partnership Project; Technical Specification Group Radio Access Network; Evolved Universal Terrestrial Radio Access (E-UTRA); Packet data Convergence Protocol (PDCP) Specification (Release 12) (Dec. 2014).
3GPP TS 36.304 v12.3.0, Technical Specification, 3rd Generation Partnership Project; Technical Specification Group Radio Access Network; Evolved Universal Terrestrial Radio Access (E-UTRA); User Equipment (UE) Procedures in Idle Mode (Release 12) (Dec. 2014).
International Search Report and Written Opinion dated Jun. 25, 2015 in PCT Application No. PCT/US2015/21034.
RP-122009, 3GPP TSG RAN Meeting #58, "Study on LTE Device to Device Proximity Services", Qualcomm Incorporated, Dec. 7, 2012.
R2-141854, 3GPP TSG-RAN Working Group 2 meeting #85bis, "Report of 3GPP TSG RAN WG2 meting #85, Prague, Czech Republic, Feb. 10-14, 2013", ETSI MCC, Valencia, Spain, Mar. 31-Apr. 4, 2014.
3GPP TS 36.214 v12.1.0, Technical Specification, 3rd Generation Partnership Project; Technical Specification Group Radio Access Network; Evolved Universal Terrestrial Radio Access (E-UTRA); Physical Layer; Measurements (Release 12) (Dec. 2014).
R2-150734, 3GPP TSG-RAN2#89 meeting, Change Request "Introduction of ProSe", Samsung, Athens, Greece, Feb. 9-13, 2015.
Final Office Action dated Apr. 21, 2017 in U.S. Appl. No. 14/660,587.
Advisory Action dated Jun. 14, 2017 in U.S. Appl. No. 14/660,559.
Advisory Action dated Jun. 23, 2017 in U.S. Appl. No. 14/660,491.
R2-152168, 3GPP TSG-RAN WG2 Meeting #90, Intel Corporation, "Priority Handling for ProSe", Fukuoka, Japan, May 25-29, 2015.
R2-144812, 3GPP TSG RAN WG2 #88, Acer Incorporated, "Cell Reselection Priority with ProSe Communication", San Francisco, USA, Nov. 17-21, 2014.
R2-142631, 3GPP TSG-RAN WG2 #86, "Prioritized Reselection of D2D Support Frequency", Seoul, Korea, May 19-23, 2014.
Office Action dated Jan. 18, 2017 in U.S. Appl. No. 14/660,587.
Final Office Action dated Feb. 28, 2017 in U.S. Appl. No. 14/660,559.
Final Office Action dated Apr. 5, 2017 in U.S. Appl. No. 14/660,491.
Advisory Action dated Dec. 14, 2016 in U.S. Appl. No. 14/660,587.
RP-150374, 3GPP TSG RAN Meeting #67, Source: TSG RAN WG2, "RAN2 agreed CRs on LTD Device to Device Proximity Services", Shanghai, China, Mar. 9-12, 2015.
Office Action dated Jan. 18, 2017 in U.S. Appl. No. 14/818,855.
International Search Report and Written Opinion dated Oct. 23, 2015 in PCT Application PCT/US15/43784.
R1-142409 3GPP TSG RAN WG1 Meeting #77, Ericsson, "Synchronization Signals and Channel Design for D2D", Seoul, Korea, May 19-23, 2014.
R1-142340 3GPP TSG RAN WG1 Meeting #77, Huawei, HiSilicon, "D2DSS Design", Seoul, Korea, May 19-23, 2014.
R1-133598 3GPP TSG-RAN WG1 #74 Qualcomm Inc., "Techniques for Synchronization", Barcelona, Spain, Aug. 19-23, 2013.
3GPP TR 36.843 V12.0.1, Technical Report; 3rd Generation Partnership Project; Technical Specification Group Radio Access Network; Study on LTE Device to Device Proximity Services; Radio Aspects (Release 12) (Mar. 2014).
3GPP TSG RAN WG1 #76BIS, "Chairman's notes", Shenzhen, China, Mar. 31-Apr. 4, 2014.
3GPP TSG RAN WG1 Meeting #77, "Chairman's notes", Seoul, Korea, May 19-23, 2014.

(56) References Cited

OTHER PUBLICATIONS

R1-142452 3GPP TSG-RAN WG1 Meeting #77, Nokia, NSN, "D2D Synchronization Signal Design", Seoul, Korea, May 19-23, 2014.
R1-141974 3GPP TSG-RAN WG1 #77, Qualcomm Incorporated, "Signal Design for D2D Synchronization", Seoul, Korea, May 19-23, 2014.
R1-135316 3GPP TSG-RAN WG1 #75, Qualcomm Incorporated, "Multi-hop D2D Synchronization Performance", San Francisco USA, Nov. 11-15, 2013.
U.S. Appl. No. 62/055,114, filed Sep. 25, 2014, entitled "Method And Apparatus For Unlicensed Communications Band Access".
U.S. Appl. No. 62/104,365, filed Jan. 16, 2015, entitled "Method And Apparatus For Selecting A Synchronization Signal Source For Device-To-Device Communications".
International Search Report and Written Opinion dated Jul. 1, 2015 in PCT Application PCT/US2015/21030.
International Search Report and Written Opinion dated Aug. 11, 2015 in PCT Application PCAT/US2015/21045.
International Search Report and Written Opinion dated Jun. 25, 2015 in PCT Application No. PCT/US2015/021027.
R2-142829, 3GPP TSG-RAN2 Meeting #86, "Introduction of ProSe", Samsung, Qualcom Incorporation, Seoul, South Korea, May 19-23, 2014.
R1-141256, 3GPP TSG RAN WG1 Meeting #76bis, "Distributed Resource Allocation for D2D Communication", Alcatel-Lucent Shanghai Bell, Alcatel-Lucent, Shen Zhen, China, Mar. 31-Apr. 4, 2014.
R1-141546, 3GPP TSG RAN WG1 Meeting #76bis, Discussion on D2D Operation Outside of Network Coverage (Mode-2), Intel Corporation, Shenzhen, China, Mar. 31-Apr. 4, 2014.
3GPP TS 23.303 V12.0.0 Technical Specification, $3^{rd}$ Generation Partnership Project; Technical Specification Group Services and Systems Aspects; Proximity-based Services (ProSe); Stage 2 (Release 12) (Feb. 2014).
R1-141859, 3GPP TSG RAN WG1 Meeting #76bis, "Way Forward on Discovery Signal Design and Network Assistance", NTT DOCOMO, Huawei, HiSilicon, Samsung, Sony, Sharp, ZTE, LG Electronics, Hitachi, ETRI, Media Tek, Shenzhen, China, Mar. 31-Apr. 4, 2014.
R2-14XXX, 3GPP TSG RAN WG1 Meeting #87, Introduction of ProSe, Samsun, Dresden, German, Aug. 18-22, 2014.
Office Action dated Sep. 30, 2016 in U.S. Appl. No. 14/660,559.
Office Action dated Nov. 18, 2016 in U.S. Appl. No. 14/660,491.
International Preliminary Report on Patentability dated Nov. 17, 2016 in PCT Application PCT/US2015/021045.
International Preliminary Report on Patentability dated Nov. 1, 2016 in PCT Application No. PCT/US2015/21041.
Final Office Action dated Sep. 30, 2016 in U.S. Appl. No. 14/660,587.
Office Action dated Jun. 10, 2016 in U.S. Appl. No. 14/660,587.
Advisory Action dated May 10, 2016 in U.S. Appl. No. 14/660,587.
Final Office Action dated Mar. 2, 2016 in U.S. Appl. No. 14/660,587.
Office Action dated Oct. 5, 2015 in U.S. Appl. No. 14/660,587.
Office Action dated Oct. 17, 2016 in U.S. Appl. No. 14/660,622.
Notice of Allowance dated May 2, 2017 in U.S. Appl. No. 14/818,855.
Office Action dated Sep. 12, 2017 in U.S. Appl. No. 14/660,559.
Office Action dated Sep. 12, 2017 in U.S. Appl. No. 14/660,491.
Notice of Allowance dated Sep. 8, 2017 in U.S. Appl. No. 14/818,855.
Supplementary EP Search Report dated Oct. 16, 2017 in EP application 15764859.3.
Supplementary EP Search Report dated Nov. 15, 2017 in EP application 15785943.0.
Notice of Allowance dated Apr. 11, 2018 in U.S. Appl. No. 14/660,559.
Examiner's Answer dated Apr. 11, 2018 in U.S. Appl. No. 14/660,587.
Final Office Action dated May 29, 2018 in U.S. Appl. No. 14/660,491.

* cited by examiner

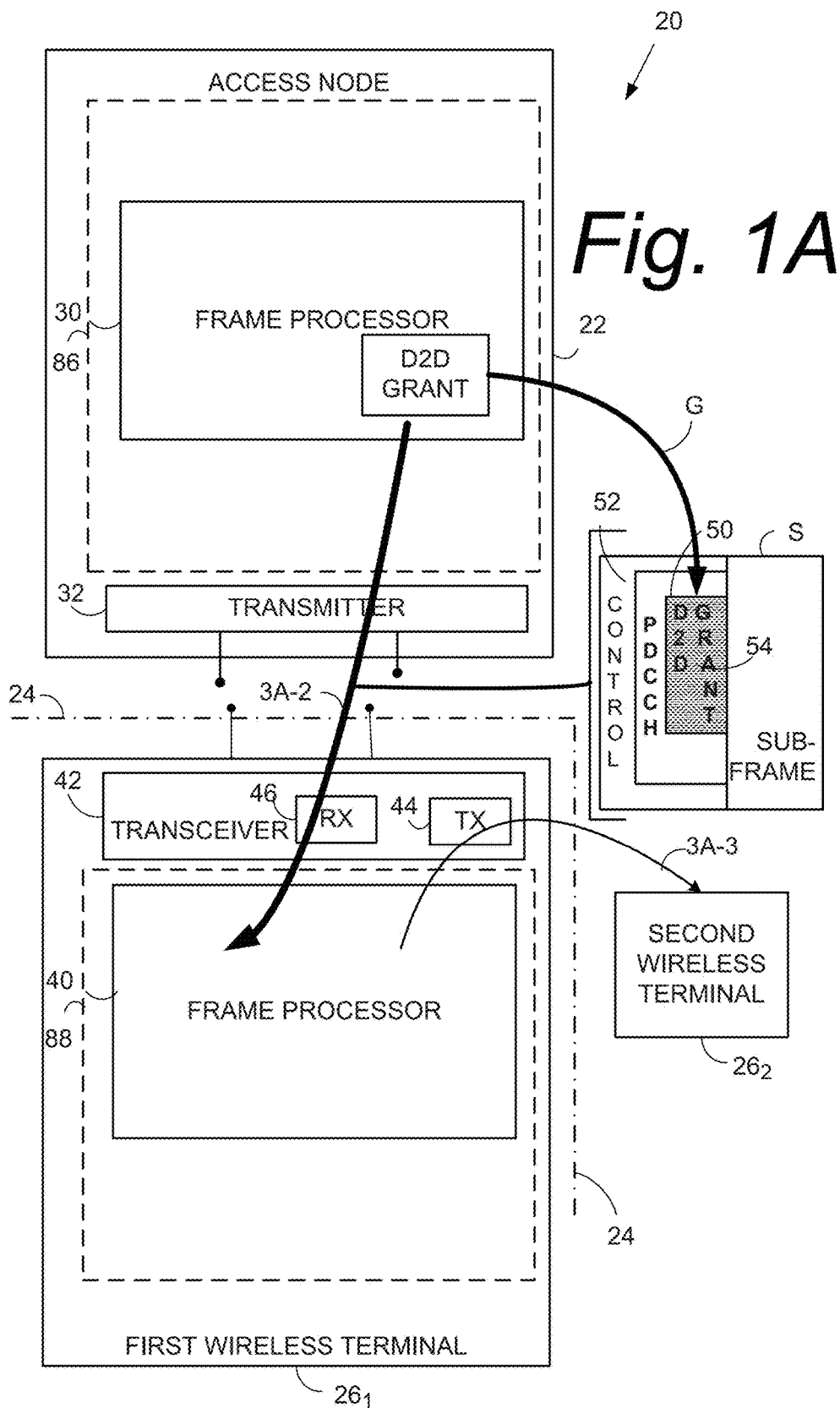

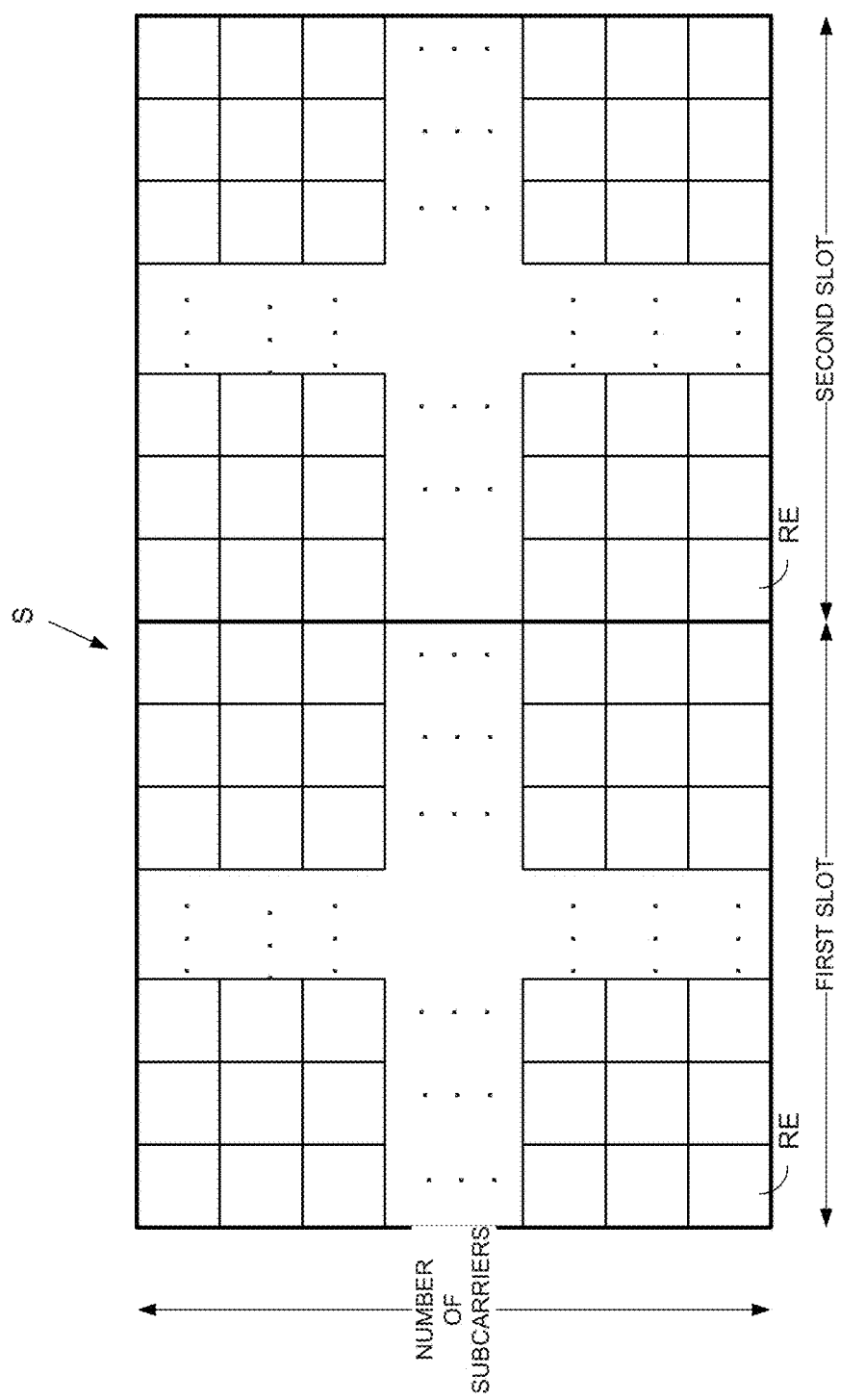

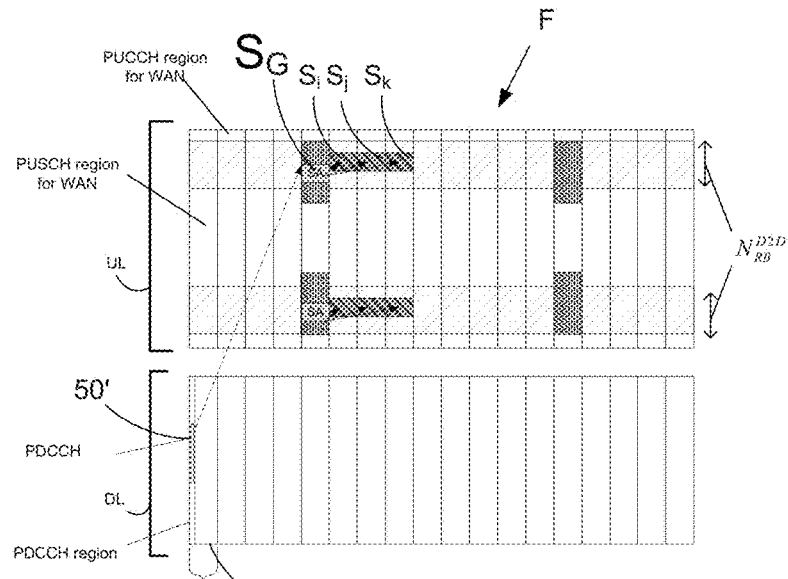
*Fig. 5A*
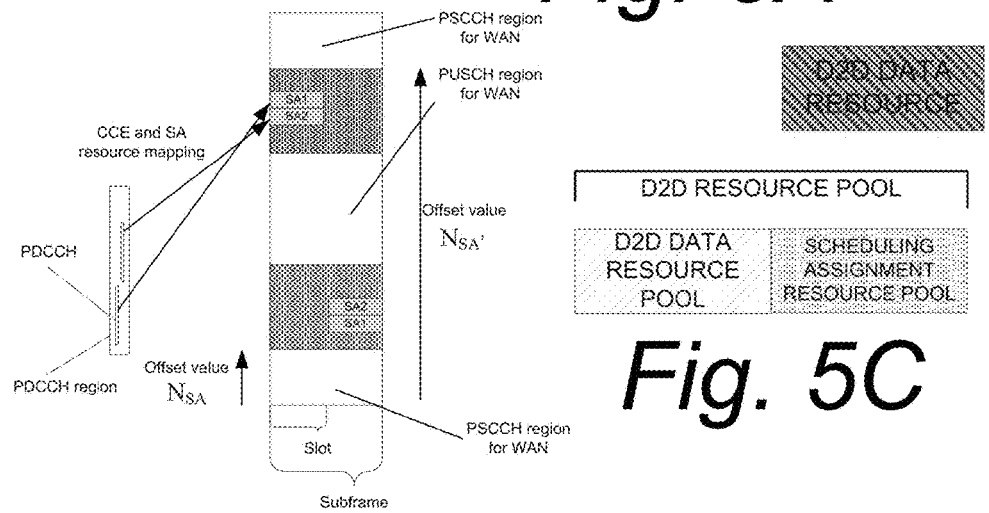
*Fig. 5B*
*Fig. 5C*

SCHEDULING WIRELESS DEVICE-TO-DEVICE COMMUNICATIONS

This application claims the priority and benefit of the following United States Provisional Patent application, which is incorporated herein by reference: U.S. Provisional Patent application 61/955,019 filed Mar. 18, 2014, entitled "SCHEDULING WIRELESS DEVICE-TO-DEVICE COMMUNICATIONS".

TECHNICAL FIELD

The technology relates to wireless communications, and particularly to allocating or granting radio resources for wireless device-to-device (D2D) communications

BACKGROUND

When two user equipment terminals (e.g., mobile communication devices) of a cellular network or other telecommunication system communicate with each other, their data path typically goes through the operator network. The data path through the network may include base stations and/or gateways. If the devices are in close proximity with each other, their data path may be routed locally through a local base station In general, communications between a network node such as a base station and a wireless terminal is known as "WAN" or "Cellular communication".

It is also possible for two user equipment terminals in close proximity to each other to establish a direct link without the need to go through a base station. Telecommunications systems may use or enable device-to-device ("D2D") communication, in which two or more user equipment terminals directly communicate with one another. In D2D communication, voice and data traffic (referred to herein as "communication signals") from one user equipment terminal to one or more other user equipment terminals may not be communicated through a base station or other network control device of a telecommunication system. As such device-to-device (D2D) communications differ from "WAN" or "Cellular communication". Device-to-device (D2D) communication has more recently also become known as "sidelink direct communication".

D2D communication, e.g., sidelink direct communication, can be used in networks implemented according to any suitable telecommunications standard. A non-limiting example of such as standard is the 3rd Generation Partnership Project ("3GPP") Long Term Evolution ("LTE"). The 3GPP standard is a collaboration agreement that aims to define globally applicable technical specifications and technical reports for present and future generation wireless communication systems. The 3GPP may define specifications for next generation mobile networks, systems, and devices. The 3GPP LTE is the name given to a project to improve the Universal Mobile Telecommunications System ("UMTS") mobile phone or device standard to cope with future requirements. In one aspect, UMTS has been modified to provide support and specification for the Evolved Universal Terrestrial Radio Access ("E-UTRA") and Evolved Universal Terrestrial Radio Access Network ("E-UTRAN"). E-UTRAN is another non-limiting example of a telecommunications standard with which D2D communication may be used.

A non-exhaustive list of 3GPP documents which describe, at least in part, device-to-device (D2D) communication (e.g., "sidelink direct communication") include the following (all of which are incorporated herein by reference in their entireties):

3GPP TS 36.201 v12.1.0, Technical Specification, $3^{rd}$ Generation Partnership Project; Technical Specification Group Radio Access Network; Evolved Universal Terrestrial Radio Access (E-UTRA); LTE Physical Layer; General Description (Release 12) (2014 December);

3GPP TS 36.211 v12.4.0, Technical Specification, $3^{rd}$ Generation Partnership Project; Technical Specification Group Radio Access Network; Evolved Universal Terrestrial Radio Access (E-UTRA); Physical Channels and Modulation (Release 12) (2014 December);

3GPP TS 36.212 v12.3.0, Technical Specification, $3^{rd}$ Generation Partnership Project; Technical Specification Group Radio Access Network; Evolved Universal Terrestrial Radio Access (E-UTRA); Multiplexing and Channel Coding (Release 12) (2014 December);

3GPP TS 36.213 v12.0.0, Technical Specification, $3^{rd}$ Generation Partnership Project; Technical Specification Group Radio Access Network; Evolved Universal Terrestrial Radio Access (E-UTRA); Physical Layer Procedures (Release 12) (2013 December);

3GPP TS 36.214 v12.1.0, Technical Specification, $3^{rd}$ Generation Partnership Project; Technical Specification Group Radio Access Network; Evolved Universal Terrestrial Radio Access (E-UTRA); Physical Layer; Measurements (Release 12) (2014 December);

3GPP TS 36.300 v12.4.0, Technical Specification, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; State 2 (Release 12) (2014 December);

3GPP TS 36.304 v12.3.0, Technical Specification, $3^{rd}$ Generation Partnership Project; Technical Specification Group Radio Access Network; Evolved Universal Terrestrial Radio Access (E-UTRA); User Equipment (UE) Procedures in Idle Mode (Release 12) (2014 December);

3GPP TS 36.306 v12.3.0, Technical Specification, $3^{rd}$ Generation Partnership Project; Technical Specification Group Radio Access Network; Evolved Universal Terrestrial Radio Access (E-UTRA); User Equipment (UE) Radio Access Capabilities (Release 12) (2014 December);

3GPP TS 36.321 v12.4.0, Technical Specification, $3^{rd}$ Generation Partnership Project; Technical Specification Group Radio Access Network; Evolved Universal Terrestrial Radio Access (E-UTRA); Medium Access Control (MAC) Protocol Specification (Release 12) (2014 December);

3GPP TS 36.322 v12.1.0, Technical Specification, $3^{rd}$ Generation Partnership Project; Technical Specification Group Radio Access Network; Evolved Universal Terrestrial Radio Access (E-UTRA); Radio Link Control (RLC) Protocol Specification (Release 12) (2014 September);

3GPP TS 36.323 v12.2.0, Technical Specification, $3^{rd}$ Generation Partnership Project; Technical Specification Group Radio Access Network; Evolved Universal Terrestrial Radio Access (E-UTRA); Packet data Convergence Protocol (PDCP) Specification (Release 12) (2014 December); and 3GPP TS 36.331 v12.4.0, Technical Specification, $3^{rd}$ Generation Partnership Project; Technical Specification Group Radio Access Network; Evolved Universal Terrestrial Radio Access (E-UTRA); Radio Resource Control (RRC) Protocol Specification (Release 12) (2014 December).

A 3GPP RAN1 Working Group has been studying expanding LTE's functionality to allow for Device-to-Device (D2D) communication to enable Proximity Services (ProSe) for public safety and, certain non-public safety requirements (See, e.g., RP-122009). However, the 3GPP RAN1 Working Group has not fully sorted out the details concerning how the resource allocation and assignment is to be managed, both in-network and out-of-network. Rather, much of the discussion has been centered on resource allocation notification—how the time/frequency location of a block of resources is communicated by an eNB to a population of wireless terminals to determine where in time/frequency D2D discussions take place. In particular, much of the discussion at present concerns out of coverage communication and how D2D transmissions take place out-of-coverage.

It has been proposed that wireless terminals, both in-coverage and out-of-coverage, need to be aware of a resource pool (e.g., a pool of time/frequency resources) for device-to-device (D2D) communications, and that all device-to-device (D2D) active wireless terminals should know how they are to receive scheduling assignments for device-to-device (D2D) purposes. See, RR-140126 Draft TR36.843, V1.2.0, Study on LTE Device to Device Proximity Services; Radio Aspects, incorporated herein by reference in its entirety.

It is also accepted that there is "continuous network control and adaptive resources allocation between ProSe and other E-UTRAN services, as long as ProSe UEs are served by E-UTRAN". That essentially means that when under network control and using E-EUTRAN resources, the D2D capable wireless terminal is under network control as depicted in FIG. 11. See, e.g., RR-140126 Draft TR36.843, V1.2.0, Study on LTE Device to Device Proximity Services; Radio Aspects.

3GPP RAN2, agreements discuss two modes of operation, Mode 1 (which is scheduled and in which the wireless terminal needs to be in radio resource control (RRC) connected mode in order to receive device-to-device (D2D) communications) and Mode 2 which is autonomous. See, e.g., "R2-14xxxx_draft_report_RAN2_85_Prague_(v0.1).doc", retrieved from the meeting Report area of the 3GPP website: http://www.3gpp.org/ftp/tsg_ran/WG2_RL2/TSGR2_85/Report/. These agreements state, among other things:

All UEs (Mode 1 ("scheduled") and Mode 2 ("autonomous")) are provided with a resource pool (time and frequency) in which they attempt to receive scheduling assignments.

2 In Mode 1, a UE requests transmission resources from an eNB. The eNB schedules transmission resources for transmission of scheduling assignment(s) and data.

2a In Mode 1, the UE sends a scheduling request (D-SR or RA) to the eNB followed by a BSR based on which the eNB can determine that the UE intends to perform a D2D transmission as well as the required amount resources.

2b In Mode 1, it is for further study how the eNB indicates the transmission resources to the UE.

2c In Mode 1, the UE needs to be RRC Connected in order to transmit D2D communication 3GPP TS36.213 V12.0.0 envisions the adaptation of an UL grant in some fashion for broadcast D2D. However the exact signaling of time frequency resources has not been specified. Furthermore, typically the D2D bandwidth to be used will be a subset of an UL carrier in order for the D2D to remain under network control.

What is needed, therefore, are methods, apparatus, and/or techniques for providing a D2D grant, and preferably a D2D grant having expression which incorporates and/or is consistent with legacy functionality. The methods, apparatus, and/or techniques provide benefits that reduce system complexity and improve communication flexibility and efficiency.

SUMMARY

In one of the various aspects the technology disclosed herein concerns a method of operating a radio access node which communicates over a radio interface with a first wireless terminal. In a general embodiment and mode the method comprises the radio access node generating a device-to-device (D2D) grant which specifies radio resources that the first wireless terminal is permitted to use for device-to-device (D2D) communication with a second wireless terminal. The method further comprises the radio access node transmitting the subframe including the D2D grant to a first wireless terminal In an example embodiment and mode the method further comprises including the device-to-device (D2D) grant in existing industry standardized field(s) of the industry standardized channels by replacing value(s) in the existing industry standardized field(s) with information concerning the device-to-device (D2D) grant.

In an example embodiment and mode the industry standard channel is a downlink control channel which in at least some subframes includes a grant of radio resources for uplink communication but which in the selected subframe instead includes the device-to-device (D2D) grant. In another example embodiment and mode the channel for the selected subframe is a physical downlink shared channel (PDSCH), and a medium access control (MAC) control element of the PDSCH is configured to specify which resource blocks of a resource grid are to be used as the radio resources for the device-to-device (D2D) communication.

In an example embodiment and mode the method further comprises the radio access node configuring Downlink Control Information (DCI) of the Physical Downlink Control Channel (PDCCH) of the selected subframe to include the D2D grant. In an example embodiment and mode a length of DCI format to be used for the D2D grant is the same length of DCI format 0 for wide area network (WAN) communication. In an example embodiment and mode the DCI format to be used for the D2D grant is shared with DCI format 0 for wide area network (WAN) communication.

In an example method and mode a resource block assignment field of the Downlink Control Information (DCI) may be configured to specify which resource blocks of a resource grid are to be used as the radio resources for the device-to-device (D2D) communication. In an example embodiment and mode wherein the Downlink Control Information (DCI) is configured to include a resource allocation type field, and wherein the resource allocation type field indicates a resource allocation type 0, the resource block assignment field of the Downlink Control Information (DCI) comprises a resource indication value (RIV). The resource indication value (RIV) corresponds to a starting resource block and a length in terms of contiguously allocated resource blocks (LCRBs). On the other hand, wherein the resource allocation type field indicates a resource allocation type 1, the resource block assignment field of the Downlink Control Information (DCI) comprises a combinatorial index r from which can be determined two sets of resource blocks to be utilized for the D2D communication.

In an example embodiment and mode the method further comprises the radio access node configuring one or more of the following fields of the Downlink Control Information (DCI) to include time domain scheduling information: Channel State Information (CSI) request field, Sounding Reference Signal (SRS) request field, uplink index field, resource allocation field, modulated and coding scheme (MSC)/redundancy version (RV) field.

In an example embodiment and mode the method further comprises the radio access node configuring at least a portion of the Downlink Control Information (DCI) to specify that the D2D grant is directed to the first wireless terminal. In an example implementation, the radio access node encodes a cyclical redundancy check (CRC) portion of the Downlink Control Information (DCI) with a D2D radio network temporary identity (RNTI) of the wireless terminal to specify that the D2D grant is directed to the first wireless terminal.

In an example embodiment and mode the method further comprises providing the first wireless terminal with a D2D bandwidth parameter $N_{RB}^{D2D}$ which specifies a number of resource blocks of a resource grid which are available for D2D communication.

In an example embodiment and mode the method further comprises the node providing the first wireless terminal with a Scheduling Assignment resource parameter which specifies an resource offset value which specify a starting position of a scheduling assignment resource pool.

In another of its aspects the technology disclosed herein concerns a radio access node of a communications network which communicates over a radio interface with a first wireless terminal. In an example embodiment the node comprises a processor and a transmitter. The processor is adapted to generate a device-to-device (D2D) grant for a selected subframe. The device-to-device (D2D) grant specifies radio resources that the first wireless terminal is permitted to use for device-to-device (D2D) communication with a second wireless terminal. The transmitter adapted to transmit the subframe including the D2D grant to the first wireless terminal over the radio interface.

In an example embodiment the node processor includes the device-to-device (D2D) grant in existing industry standardized field(s) of the industry standardized channel by replacing value(s) in the existing industry standardized field(s) with information concerning the device-to-device (D2D) grant.

In an example embodiment the channel is a downlink control channel which in at least some subframes includes a grant of radio resources for uplink communication but which in the selected subframe instead includes the device-to-device (D2D) grant. In another example embodiment the physical channel for the selected subframe is a physical downlink shared channel (PDSCH), and a medium access control (MAC) control element of the PDSCH is configured to specify which resource blocks of a resource grid are to be used as the radio resources for the device-to-device (D2D) communication.

In an example embodiment the node processor is adapted to configure a Physical Downlink Control Channel (PDCCH) of a selected subframe to include a device-to-device (D2D) grant. In an example embodiment the processor is adapted to configure Downlink Control Information (DCI) of the Physical Downlink Control Channel (PDCCH) of the subframe to include the D2D grant. In an example embodiment and mode a length of DCI format to be used for the D2D grant is the same length of DCI format 0 for wide area network (WAN) communication. In an example embodiment and mode the DCI format to be used for the D2D grant is shared with DCI format 0 for wide area network (WAN) communication In an example embodiment the node processor is adapted to configure a resource block assignment field of the Downlink Control Information (DCI) to specify which resource blocks of a resource grid are to be used as the radio resources for the device-to-device (D2D) communication. When a resource allocation type field of the DCI indicates a resource allocation type 0, the processor configures the resource block assignment field of the Downlink Control Information (DCI) to comprise a resource indication value (RIV). The resource indication value (RIV) corresponds to a starting resource block and a length in terms of contiguously allocated resource blocks (LCRBs). On the other hand, when the resource allocation type field indicates a resource allocation type 1, the processor configures the resource block assignment field of the Downlink Control Information (DCI) to comprise a combinatorial index r from which can be determined two sets of resource blocks to be utilized for the D2D communication.

In an example embodiment the node processor is adapted to configure one or more of the following fields of the Downlink Control Information (DCI) to include time domain scheduling information: CSI request field, SRS request field, uplink index field, resource allocation field, modulated and coding scheme (MSC)/redundancy version (RV) field.

In an example embodiment the node processor is adapted to configure at least a portion of the Downlink Control Information (DCI) to specify that the D2D grant is directed to the first wireless terminal. In a particular implementation, the processor is adapted to encode a cyclical redundancy check (CRC) portion of the Downlink Control Information (DCI) with a D2D radio network temporary identity (RNTI) of the wireless terminal to specify that the D2D grant is directed to the first wireless terminal.

In an example embodiment, the node processor is adapted to provide the first wireless terminal with a D2D bandwidth parameter $N_{RB}^{D2D}$ which specifies a number of resource blocks of a resource grid which are available for D2D communication.

In yet another of its aspects the technology disclosed herein concerns a wireless terminal which comprises a receiver, a processor, and a transmitter. The receiver is configured to receive a device-to-device (D2D) grant which specifies radio resources that the wireless terminal is permitted to use for device-to-device (D2D) communication with another wireless terminal. The transmitter is configured to transmit device-to-device (D2D) data to another wireless terminal using radio resources permitted by the D2D grant.

In an example embodiment the terminal processor receives the device-to-device (D2D) grant in existing industry standardized field(s) of the industry standardized physical channel in which value(s) in the existing industry standardized field(s) have been replaced with information concerning the device-to-device (D2D) grant.

In an example embodiment the physical channel is a downlink control channel which in at least some subframes includes a grant of radio resources for uplink communication but which in the selected subframe instead includes the device-to-device (D2D) grant. In another example embodiment the physical channel for the selected subframe is a physical downlink shared channel (PDSCH), and a medium access control (MAC) control element of the PDSCH is configured to specify which resource blocks of a resource grid are to be used as the radio resources for the device-to-device (D2D) communication.

In an example embodiment the processor configured to receive the device-to-device (D2D) grant in a Physical Downlink Control Channel (PDCCH) of the selected subframe.

In an example embodiment the transmitter is further configured to transmit to the second wireless terminal D2D grant information so that the second wireless terminal can participate in device-to-device (D2D) communications.

In an example embodiment the processor is configured to determine the D2D grant from Downlink Control Information (DCI) of the Physical Downlink Control Channel (PDCCH) of the selected subframe. In an example embodiment, other than content of the D2D grant the Downlink Control Information (DCI) and the Physical Downlink Control Channel (PDCCH) are formatted in accordance with Third Generation Partners Project (3GPP) Technical Specification 36.212 Version 12.0.0.

In an example embodiment the processor is configured to receive, in a resource block assignment field of the Downlink Control Information (DCI), an indication of which resource blocks of a resource grid are to be used as the radio resources for the device-to-device (D2D) communication.

When a resource allocation type field of the DCI indicates a resource allocation type 0, the processor is configured to obtain from the resource block assignment field of the Downlink Control Information (DCI) a resource indication value (RIV). The resource indication value (RIV) corresponds to a starting resource block and a length in terms of contiguously allocated resource blocks (LCRBs). On the other hand, when the resource allocation type field indicates a resource allocation type 1, the processor is configured to obtain from the resource block assignment field of the Downlink Control Information (DCI) a combinatorial index r from which can be determined two sets of resource blocks to be utilized for the D2D communication.

In an example embodiment the processor is configured to detect time domain scheduling information from one or more of the following fields of the Downlink Control Information (DCI): CSI request field, SRS request field, uplink index field, resource allocation field, modulated and coding scheme (MSC)/redundancy version (RV) field.

In an example embodiment the processor is configured to detect from at least a portion of the Downlink Control Information (DCI) to specify that the D2D grant is directed to the first wireless terminal. In an example implementation, the processor is configured to detect from a cyclical redundancy check (CRC) portion of the Downlink Control Information (DCI) encoded with a D2D radio network temporary identity (RNTI) of the wireless terminal that the D2D grant is directed to the first wireless terminal.

In an example embodiment the processor is configured with a D2D bandwidth parameter $N_{RB}^{D2D}$ which specifies a number of resource blocks of a resource grid which are available for D2D communication.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 1A is a schematic view of an example generic embodiment of a radio communications network in which a radio access node provides a device-to-device (D2D) grant in an industry standard PDCCH.

FIG. 2 is a diagrammatic view of an example subframe suitable for use in providing a device-to-device (D2D) grant for the network of FIG. 1A and/or FIG. 1B and/or FIG. 9.

FIG. 5A is a diagrammatic view illustrating an example frame which includes both a Physical Downlink Control Channel (PDCCH) and subframes which include device-to-device (D2D) data.

FIG. 5B is a diagrammatic view illustrating another example scheduling strategy for device-to-device (D2D) communications, FIG. 5C is a diagrammatic view illustrating a D2D resource pool which comprises both scheduling assignment resources and D2D data resources according to an example embodiment.

DETAILED DESCRIPTION

Figure 1:
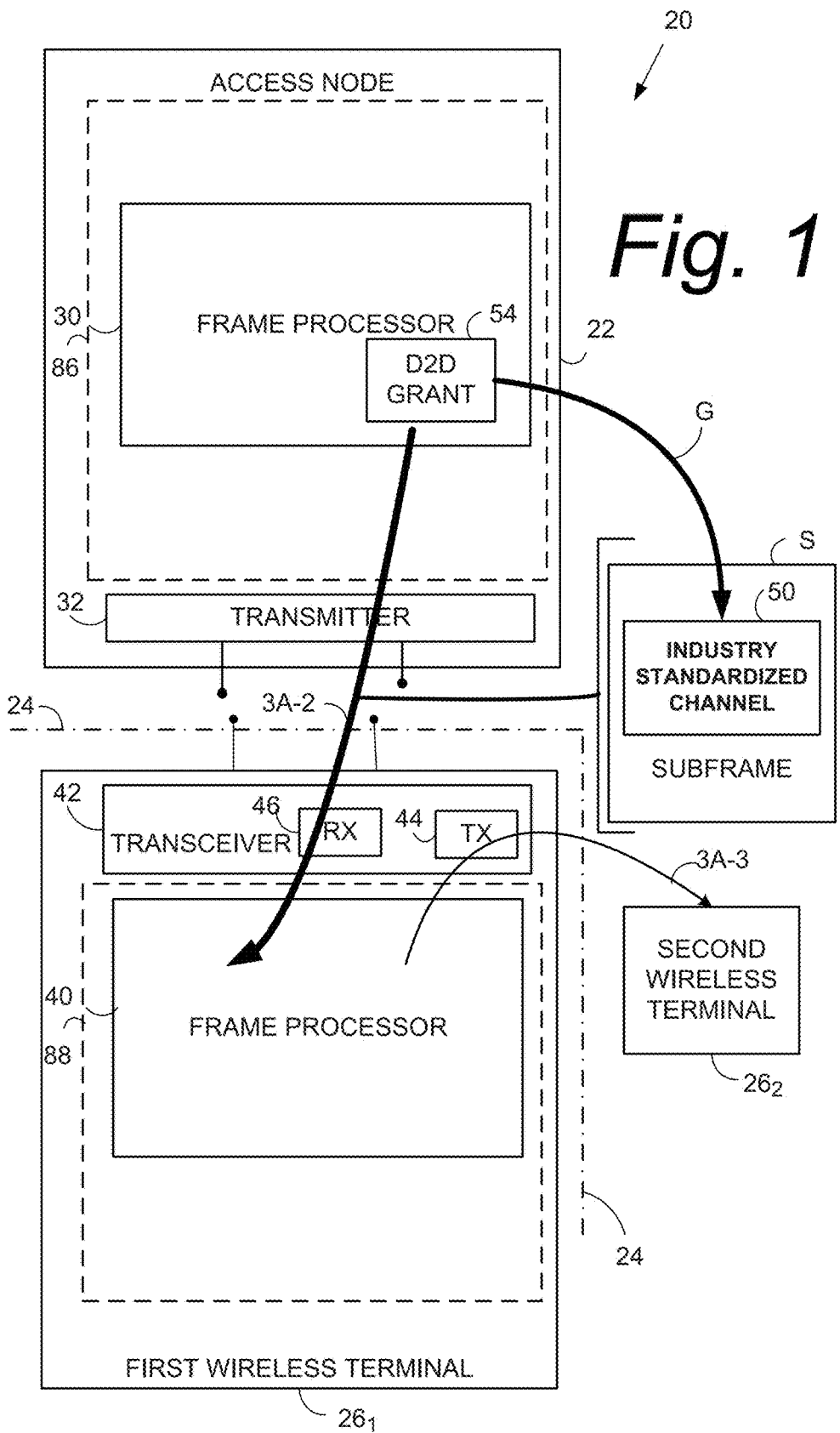
FIG. 1 is a schematic view of an example generic embodiment of a radio communications network in which a radio access node provides a device-to-device (D2D) grant in an industry standard channel.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "device-to-device ("D2D") communication" can refer to a mode of communication between or among wireless terminals that operate on a cellular network or other telecommunications system in which the communication data traffic from one wireless terminal to another wireless terminal does not pass through a centralized base station or other device in the cellular network or other telecommunications system. As explained above, device-to-device (D2D) communication is also known by the more recent term "sidelink direct communication". Thus, as mentioned above, device-to-device (D2D) communications differs from "WAN" or "Cellular communication" which is or involves communication between the base station and the wireless terminal. Communication data is sent using communication signals and can include voice communications or data communications intended for consumption by a user of a wireless terminal. Communication signals may be transmitted directly from a first wireless terminal to a second wireless terminal via D2D communication. In various aspects, all, some or none of the control signaling related to the D2D packet transmission may be managed or generated by the underlying core network or base station. In additional or alternative aspects, a receiver user equipment terminal may relay communication data traffic between a transmitter user equipment terminal and one or more additional receiver user equipment terminals.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB") or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, and/or 12), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal A cellular network using licensed frequency bands can include configured cells. Configured cells can include cells of which a UE terminal is aware and in which it is allowed by a base station to transmit or receive information.

As used herein, a "D2D signal" or "D2D signals" includes channels, reference signals, and synchronization signals for D2D communication and/or discovery.

The technology disclosed herein concerns, e.g., systems and methods for allocating transmission resources for given device-to-device (D2D) transmission. If under network control such allocation would be termed a "D2D grant," which is also referred to as a "D2D scheduling assignment". D2D modes of operation include Mode 1 (which is scheduled) and Mode 2 (which is autonomous). While the ensuing discussion primarily describes Mode 1, aspects of Mode 1 may also be applied as well to Mode 2. The applicability of Mode 2 involves straightforward changes to the signaling methodology due to the fact that in Mode 2 the receiving wireless terminals are not under network control when they are informed of schedule assignments.

FIG. 1 shows an example communications system 20 wherein radio access node 22 communicates over air or radio interface 24 with first wireless terminal $26_1$. The node 22 comprises node processor 30 and node transmitter 32. The first wireless terminal $26_1$ comprises terminal processor 40 and terminal transceiver 42. The terminal transceiver 42 typically comprises terminal transmitter section 44 and terminal receiver section 46. The terminal transmitter section 44 may comprise terminal transmitter circuitry and may be known as "transmitter"; the terminal receiver section 46 may comprise terminal receiver circuitry and may be known as "receiver".

In general operation node 22 and first wireless terminal 26₁ communicate with each other across radio interface 24 using "frames" of information that are typically formatted and prepared by a scheduler of node 22. In Long Term Evolution (LTE) a frame, which may have both downlink portion(s) and uplink portion(s), is communicated between the base station and the wireless terminal Each LTE frame may comprise plural subframes. For example, in the time domain, a 10 ms frame consists of ten one millisecond subframes. A representative, sample depiction of a subframe S according to an example implementation is shown in FIG. 2. In the time domain, each LTE subframe is divided into two slots (so that there are thus 20 slots in a frame). The transmitted signal in each slot is described by a resource grid comprised of resource elements (RE). Each column of the two dimensional grid of FIG. 2 represents a symbol (e.g., an OFDM symbol on downlink (DL) from node to wireless terminal; an SC-FDMA symbol in an uplink (UL) frame from wireless terminal to node). Each row of the grid of FIG. 2 represents a subcarrier. A resource element (RE) is the smallest time-frequency unit for downlink transmission in the subframe S. That is, one symbol on one sub-carrier in the sub-frame comprises a resource element (RE) which is uniquely defined by an index pair (k,l) in a slot (where k and l are the indices in the frequency and time domain, respectively). In other words, one symbol on one sub-carrier is a resource element (RE). Each symbol comprises a number of sub-carriers in the frequency domain, depending on the channel bandwidth and configuration. The smallest time-frequency resource supported by the standard today is a set of plural subcarriers and plural symbols (e.g., plural resource elements (RE)) and is called a resource block (RB). A resource block may comprise, for example, 84 resource elements, i.e., 12 subcarriers and 7 symbols, in case of normal cyclic prefix.

The frame and subframe structure of FIG. 2 serves only as an example of a technique of formatting of information that is to be transmitted over a radio or air interface. It should be understood that "frame" and "subframe" are not to be limited by the specific description of FIG. 2 unless otherwise stated (e.g., by specific reference to components thereof). Rather, "frame" and "subframe" may even be utilized interchangeably or may include or be realized by other units of information formatting, and as such may bear other terminology (such as blocks, for example).

Long Term Evolution (LTE) defines a number of downlink physical channels which carry information received from Medium Access Control (MAC) and higher layers. Among the transport channels are Broadcast Channel (BCH), Downlink Shared Channel(s) (DL-SCH), Paging Channel (PCH), Uplink Shared Channel(s) (UL-SCH), Random Access Channel(s) (RACH), and Multicast Channel(s) (MCH). Among the physical layer channels defined for the downlink in LTE are the Physical Broadcast Channel (PBCH), the Physical Downlink Control Channel (PDCCH), the Physical Control Format Indicator Channel (PCFICH), the Physical Hybrid ARQ Indicator Channel (PHICH), the Relay Physical Downlink Control Channel (R-DPCCH), the Physical Downlink Shared Channel (PDSCH), and the Physical Multicast Channel (PMCH). Among the physical layer channels defined for the uplink in LTE are the Physical Uplink Shared Channel (PUSCH), Physical Uplink Control Channel (PUCCH), and Physical Random Access Channel (PRACH).

In Long Term Evolution (LTE) no dedicated data channels are used, instead shared channel resources are used in both downlink and uplink. For example, the Physical Downlink Shared Channel (PDSCH) is the main physical channel used for unicast data transmission, and is also used for transmission of paging information. These shared resources are controlled by one or more schedulers that assign(s) different parts of the downlink and uplink shared channels to different wireless terminals for reception and transmission respectively. The assignments for the shared channels are transmitted in a control region which is provided in the beginning of each downlink subframe. The control region (CR) comprises the aforementioned downlink control channels including the Physical Downlink Control Channel (PDCCH). The control region typically occupies the first 1, 2, or 3 OFDM symbols in a subframe and typically extends over the entire system bandwidth.

Of the control channels mentioned above, the PDCCH typically carries the resource assignment for wireless terminals which are contained in a Downlink Control Information (DCI) message. Multiple PDCCHs can be transmitted in the same subframe using Control Channel Elements (CCE) each of which is a nine set of four resource elements known as Resource Element Groups (REG).

When a wireless terminal desires to send information on the uplink to the node 22, the wireless terminal sends a scheduling request to the node 22 followed by a buffer status report from which the node 22 can determine that the wireless terminal intends to perform an uplink transmission. Thereafter in a downlink (DL) subframe the node 22 indicates on Physical Downlink Control Channel (PDCCH) what radio resources the wireless terminal may use for its desired uplink transmission, e.g., the node 22 provides an uplink grant for an uplink transmission.

As mentioned above, in some instances wireless terminals may communicate with one another without having those communications transmitted through the node 22. Such terminal-to-terminal communications are also called device-to-device (D2D) communications, or more recently also called sidelink direct communications. At some times the device-to-device (D2D) communications may be under network control or "in-coverage", meaning that one or more of the wireless terminal involved in the device-to-device (D2D) communications may be within range of radio frequencies utilized by a node or cell of a radio access network (RAN).

In the circumstances of such in-coverage device-to-device (D2D) communications, wireless terminals utilize radio resources that are scheduled by the network, e.g., by node 22. On the other hand, in some circumstances the device-to-device (D2D) communications occurs with one or both of the participating wireless terminals being out-of-coverage. Typically the D2D data resource(s) which a particular wireless terminal may use are dynamically assigned by a D2D grant which is issued by the network, before any device-to-device (D2D) communications. Typically the D2D data resource(s) which a particular wireless terminal may use are randomly selected, before any device-to-device (D2D) communications, from a D2D data resource pool which is pre-configured at the wireless terminal or pre-assigned by the network. The necessary information to allow receiving wireless terminals to know on what radio resources the transmitting wireless terminal will send the receiving wireless terminals device-to-device (D2D) signals is referred to herein by such term as Scheduling Assignment. Transmission resource(s) for the Scheduling Assignment is referred to herein by such terms as Scheduling Assignment resource(s). Typically the Scheduling Assignment resource(s) which a particular wireless terminal may use are dynamically assigned to the wireless terminal by the network from a configured Scheduling Assignment resource pool. Typically the Scheduling Assignment resource(s) which a particular wireless terminal may use is randomly selected, before any SA transmission, from a SA resource pool which is pre-configured at the wireless terminal or pre-assigned by the network to the wireless terminal by the network. The receiving wireless terminal continuously monitors such SA resource pool to decode Scheduling Assignment. Thus, resources that may be used for device-to-device (D2D) communications are scheduling assignment resources and D2D data resources. Both scheduling assignment resources pool and D2D data resource pool are distributed from a larger set of resources known herein as the D2D resource pool, as illustrated in FIG. 5C. FIG. 5C also provides a key for resource use in FIG. 5A and FIG. 5B, hereinafter discussed.

When "in-coverage" care must be taken that use of radio resources of the device-to-device (D2D) communications not cause interference with the other types of communications on-going in the cell, e.g., communications between the node 22 and the wireless terminals served by the node 22. For the D2D communications, an uplink carrier is used for a frequency division duplex (FDD) network and uplink subframes are used for a time division duplex (TDD) network. In a D2D communication, a D2D signal is transmitted from a wireless terminal to another wireless terminal(s). The D2D signal includes a Physical D2D Data Channel (PD2DDCH), a Physical Uplink Shared Channel (PUSCH), a Physical Uplink Control Channel (PUCCH), and a reference signal. The D2D communication may use PD2DCDCH. The PD2DDCH may have similar structure with PUSCH. Alternatively the D2D communication may use PUSCH.

The technology disclosed herein provides techniques for scheduling radio resources for use in device-to-device (D2D) communications, particularly when a transmitting wireless terminal participating in the device-to-device (D2D) communications (e.g., first wireless terminal $26_1$) is in RRC connected state, e.g., served by a base station of a radio access network (RAN). A receiving wireless terminal participating in the device-to-device (D2D) communications (e.g., second wireless terminal $26_2$) may be in RRC idle state or in RRC connected state. As described herein, node processor 30 of node 22 configures a device-to-device (D2D) grant. For example, as indicated by arrow G in FIG. 1 node processor 30 configures industry standard channel 50' of selected subframe S to include a device-to-device (D2D) grant 54. The device-to-device (D2D) grant 54 of the technology disclosed herein, so situated in channel 50', specifies radio resources that first wireless terminal $26_1$ is permitted to use for device-to-device (D2D) communication with a second wireless terminal, e.g., second wireless terminal $26_2$.

The channel which carries the device-to-device (D2D) grant 54 may, in some example but not exclusive embodiments and modes, be an industry standard channel. As used herein, an "industry standard channel" is any channel that is described in an industry standard. As used herein, "industry standard" means any document, whether printed or electronic, that currently or hereafter is adopted by a standards organization, such as the 3rd Generation Partnership Project ("3GPP"). The channels described in 3GPP standards documents incorporated herein are non-exclusive examples of industry standard channels.

As used herein and described in example manner hereafter, "including" a device-to-device (D2D) grant in an industry physical channel may comprise replacing value(s) in existing industry standardized field(s) of the industry standard channel with information concerning the device-to-device (D2D) grant.

In some example embodiments and modes the physical channel is a downlink control channel which, in at least some subframes, includes a grant of radio resources for uplink communication, but which in the selected subframe instead includes the device-to-device (D2D) grant. In one example embodiment and mode, represented by FIG. 1A, the channel which includes the device-to-device (D2D) grant 54 comprises Physical Downlink Control Channel (PDCCH) 50', located in control region 52 of downlink (DL) subframe S. As used herein, "Physical Downlink Control Channel (PDCCH)" may include the Enhanced Physical Downlink Control Channel (EPDCCH). Instead of the PDCCH the EPDCCH can be transmitted in the same subframe using Enhanced Control Channel Elements (ECCE) each of which is a nine set of four resource elements mapped to PDSCH region known as Enhanced Resource Element Groups (EREG). The Physical Downlink Control Channel (PDCCH) 50' may actually reside in an unillustrated Physical Downlink Control Channel (PDCCH) region in which PDCCHs for other wireless terminals are also provided. The device-to-device (D2D) grant 54 of the technology disclosed herein, so situated in Physical Downlink Control Channel (PDCCH) 50', specifies radio resources that first wireless terminal $26_1$ is permitted to use for device-to-device (D2D) communication with a second wireless terminal, e.g., second wireless terminal $26_2$.

Figure 1B:
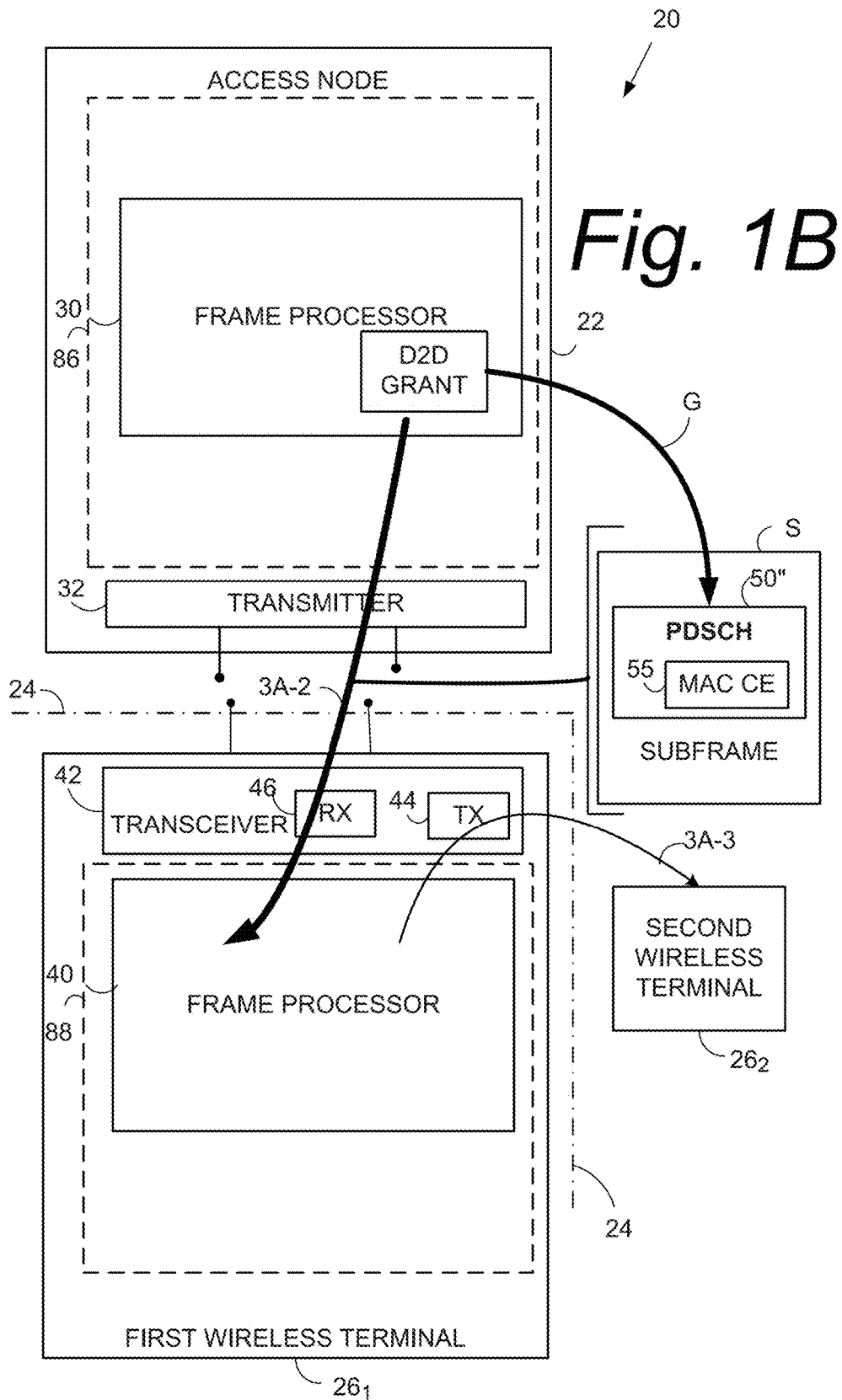
FIG. 1B is a schematic view of an example generic embodiment of a radio communications network in which a radio access node provides a device-to-device (D2D) grant in an industry standard PDSCH.

In other example embodiments and modes represented by FIG. 1B, the industry standard channel is a downlink shared channel (PDSCH) 50". For the example embodiment and mode of FIG. 1B the node processor 30 is adapted to configure one or more medium access control (MAC) control element(s) 55 of the PDSCH to specify which resource blocks of a resource grid are to be used as the radio resources for the device-to-device (D2D) communication.

Figure 3A:
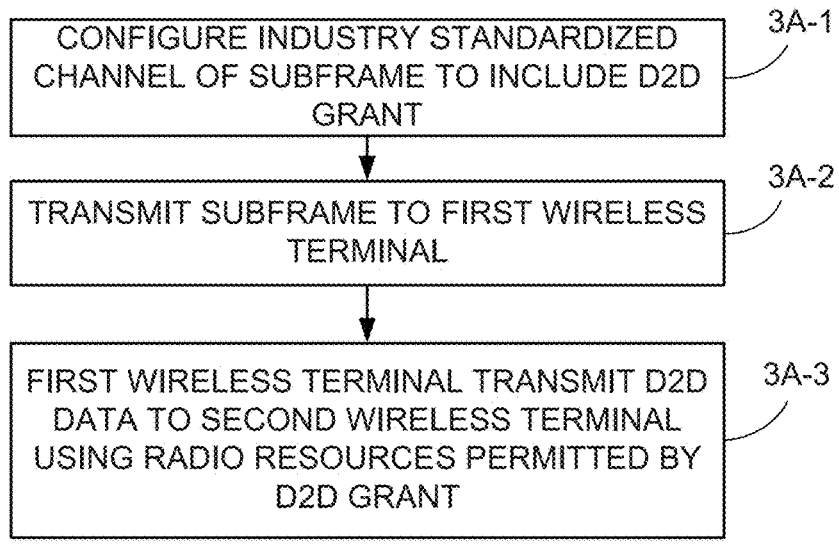
FIG. 3A and FIG. 3B are flowcharts depicting example acts or steps included in basic, representative methods of operating the communications system of FIG. 1A and/or FIG. 1B and/or FIG. 9 for providing a device-to-device (D2D) grant.
Figure 9:
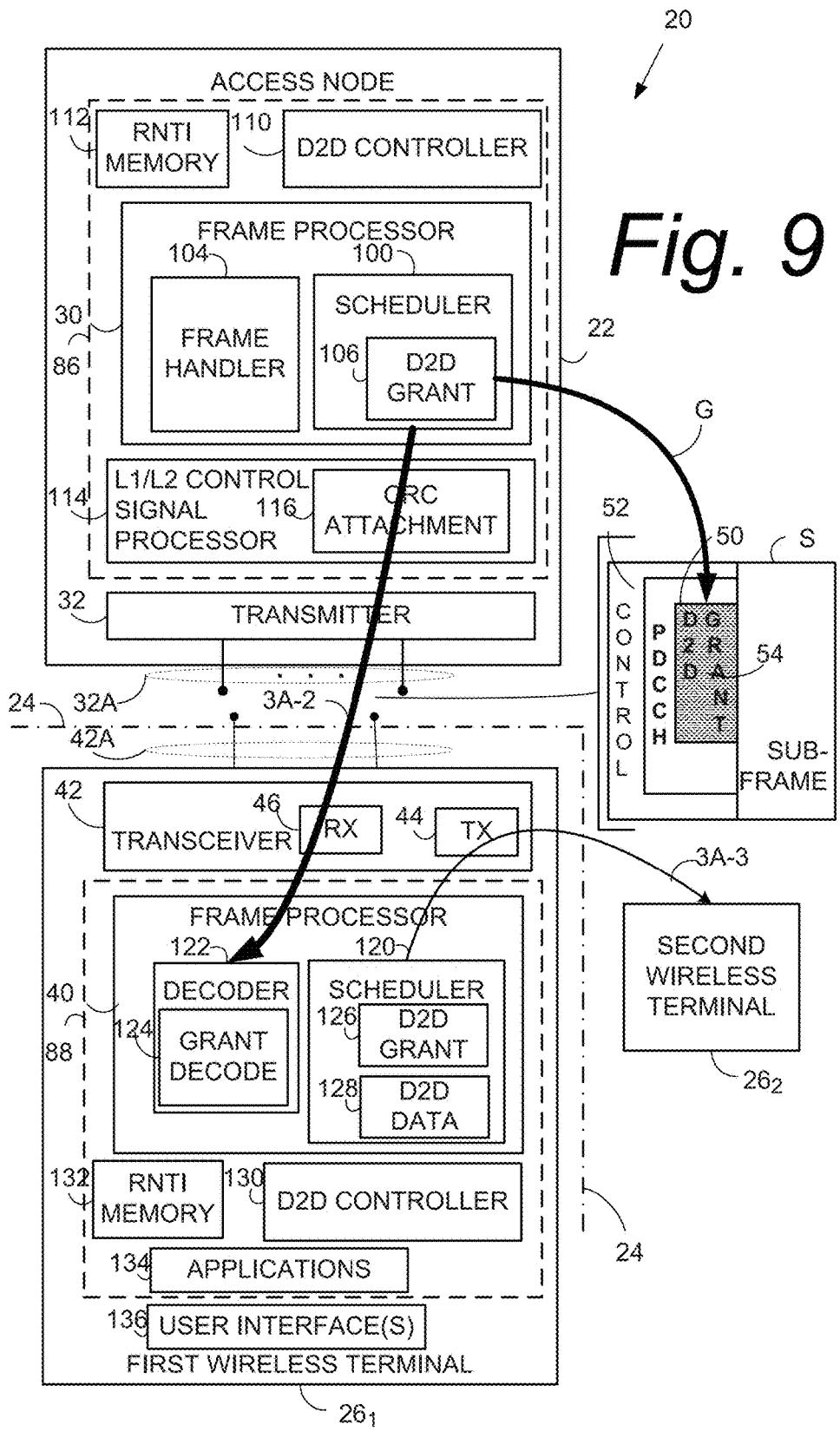
FIG. 9 is a schematic view showing in more detail an example embodiment of the radio communications network of FIG. 1A.

FIG. 3A illustrates example acts or steps involved in an example method of operating the communications system 20 of FIG. 1A (encompassing also FIG. 9 described hereinafter) and FIG. 1B. Act 3A-1 comprises the node processor 30 configuring a channel to include a device-to-device (D2D) grant. The channel may be a channel of a subframe, such as subframe S shown. Act 3A-2 (also shown as an arrow in FIG. 1A and FIG. 1B) comprises the node transmitter 32 transmitting the device-to-device (D2D) grant 54, to first wireless terminal $26_1$ over radio interface 24. The grant may be transmitted in subframe S, for example. Act 3A-3 comprise first wireless terminal $26_1$ transmitting device-to-device (D2D) communications to second wireless terminal $26_2$ using radio resources permitted by device-to-device (D2D) grant 54. FIG. 1A, FIG. 1B, and FIG. 9 also depict act 3A-3 by a comparably numbered arrow. Typically, although not necessarily exclusively, the device-to-device (D2D) communications may comprise a unidirectional transmission from first wireless terminal $26_1$ to at least second wireless terminal $26_2$, and perhaps even a broadcast from first wireless terminal $26_1$ to plural wireless terminals including second wireless terminal $26_2$.

In some instances second wireless terminal $26_2$ may be in-coverage and also able to obtain from node 22 or otherwise the necessary information to allow second wireless terminal $26_2$ to know on what radio resources the first wireless terminal $26_1$ will send the second wireless terminal $26_2$ device-to-device (D2D) signals (i.e. D2D communications). But typically the device-to-device (D2D) grant 54 is addressed only to first wireless terminal $26_1$, or second wireless terminal $26_2$ is even out-of-coverage, with the result that second wireless terminal $26_2$ must separately be informed of the device-to-device (D2D) grant 54. For that reason the method variation of FIG. 3B shows the further the act 3B-3 which comprises first wireless terminal $26_1$ transmitting to the second wireless terminal certain D2D grant information (e.g., Scheduling Assignment information) so that the second wireless terminal can participate in device-to-device (D2D) communications.

In some example implementations the Scheduling Assignment (SA) Information may actually comprise the device-to-device (D2D) grant 54 itself, so that act 3B-3 basically involves the first wireless terminal $26_1$ forwarding or relaying the device-to-device (D2D) grant 54 to second wireless terminal $26_2$. In yet other example implementations the first wireless terminal $26_1$ may issue the Scheduling Assignment (SA) Information comprising its own modified device-to-device (D2D) grant 54' which may be more appropriately or easily comprehensible by second wireless terminal $26_2$ but be consistent with the original device-to-device (D2D) grant 54. For example, as explained herein, a portion of the information included in the D2D grant may need to be encoded with an address or identity of the recipient wireless terminal(s). In such method variation act 3B-3 occurs before act 3A-3.

Figure 3B:
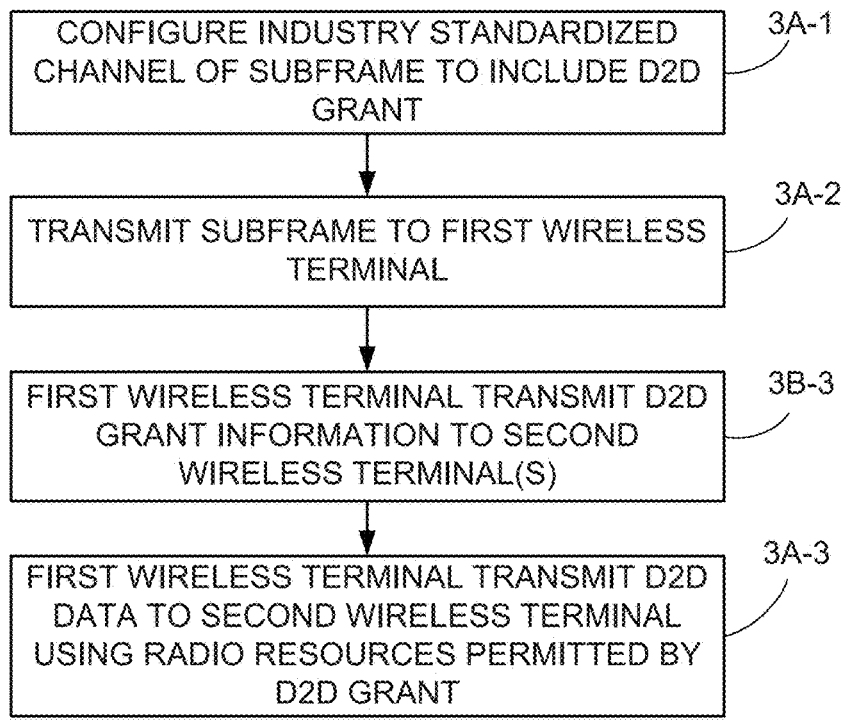
Figure 4:
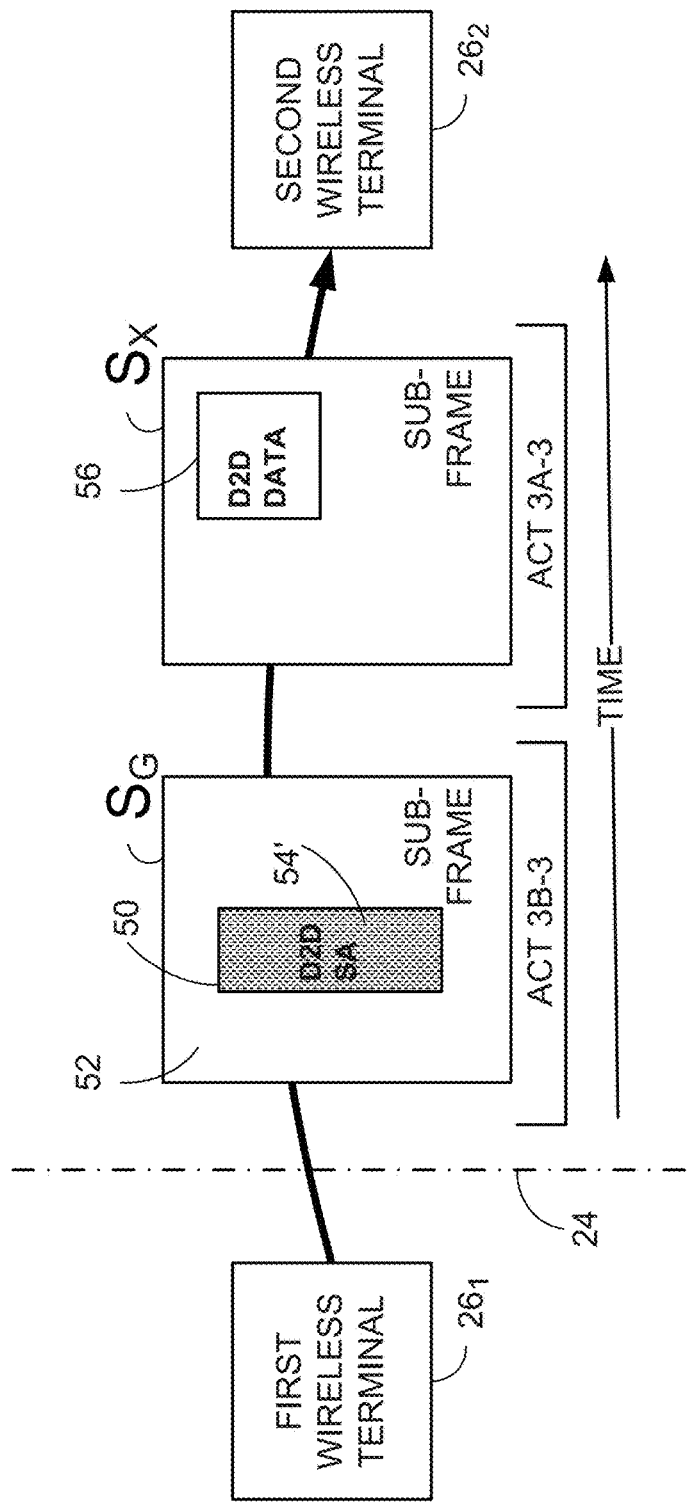
FIG. 4 is a diagrammatic view illustrating a sequence of acts comprising the method of FIG. 3B.

The method of FIG. 3B is also illustrated in FIG. 4. FIG. 4 particularly shows first wireless terminal $26_1$ first transmitting across radio interface 24 in a grant-bearing subframe $S_G$ a D2D signal which includes the device-to-device (D2D) grant 54 or modified device-to-device (D2D) grant 54', as discussed above (act 3B-3). After transmission in grant-bearing subframe $S_G$, as act 3A-3 the first wireless terminal $26_1$ transmits a D2D signal in another subframe $S_X$. In the radio resources of subframe $S_X$ which are allocated to device-to-device (D2D) communications as notified by the grant-bearing subframe $S_G$ bear or carry device-to-device (D2D) data 56 which is the content of the device-to-device (D2D) transmission or broadcast from first wireless terminal $26_1$ to second wireless terminal $26_2$, and possibly to other wireless terminals as well. It should be appreciated that the subframe $S_X$ is shown as including only the device-to-device (D2D) data 56 for sake of simplicity Moreover, it should be understood that more than one subframes of a frame may bear device-to-device (D2D) data as prescribed by one or more device-to-device (D2D) grants 54, the grants being included in a grant-bearing subframe $S_G$. For example, from FIG. 5A it will be appreciated that other subframes such as subframes Si, Sj, Sk of a frame F may be allocated for device-to-device (D2D) communications. FIG. 5A happens to shows the Physical Downlink Control Channel (PDCCH) 50' for second wireless terminal $26_2$ residing in a PDCCH region of control region 52. FIG. 5A further shows device-to-device (D2D) data being transmitted, or at least allocated resources, in other subframes Si, Sj, Sk of a frame F in accordance with the device-to-device (D2D) grant which is included in Physical Downlink Control Channel (PDCCH) 50'. Both scheduling assignment resources and D2D data resources may share a configured single resource pool. Each of Scheduling assignment resources and D2D data resources may be mapped in a separately configured resource pool (e.g., Scheduling Assignment pool and D2D Data Resource pool). Scheduling assignment transmission subframe n may be implicitly determined, where the PDCCH subframe n–k, k is 4 for FDD, k is other values for TDD.

FIG. 5B shows another example scheduling strategy for device-to-device (D2D) communications. In FIG. 5B the Scheduling Assignment pool is configured with offset $N_{SA}$ which may be signaled by broadcast system information. $N_{SA}$ may be signaled by dedicated radio resource control signaling. $N_{SA}$ is an offset value from Resource Block index 0. Usually the PUCCH region is allocated in both edges in uplink subframe. $N_{SA}$ can specify a starting position of Scheduling Assignment (SA) pool. This offset may be beneficial to avoid confliction with PUCCH. A Scheduling Assignment transmission resource for a wireless terminal may be determined based on $N_{SA}$ and an index of a first CCE of the PDCCH for the D2D grant for the wireless terminal. Alternatively, the Downlink Control Information (DCI) for the D2D grant may provide adjustment information for the scheduling assignment transmission resource, which can be used similarly to the index of CCE. A Scheduling Assignment transmission resource for a wireless terminal may be determined based on $N_{SA}$ and adjustment information provided by the D2D grant for the wireless terminal. Frequency hopping may be applied between a first slot and a second slot. A second slot resource is automatically determined based on the first slot resource. Scheduling Assignment transmission resource pool for both edges are allocated by the single value of $N_{SA}$ $N_{SA'}$ which is a starting position of the other end may be calculated by $N_{RB}^{UL} - N_{SA'}$, where the other end resource are in opposite direction.

In an example embodiment basically illustrated by FIG. 1A, the node processor 30 is adapted to configure Downlink Control Information (DCI) (format 0) of the Physical Downlink Control Channel (PDCCH) 50' of the subframe to include the device-to-device (D2D) grant 54. In general, DCI transports downlink (DL) or uplink (UL) scheduling information, transports requests for aperiodic channel quality indication (CQI) reports; transports notifications of MCCH change or uplink power control commands for one cell and one RNTI. As explained hereinafter, the RNTI is implicitly encoded in cyclical redundancy check field (CRC).

Figure 6:
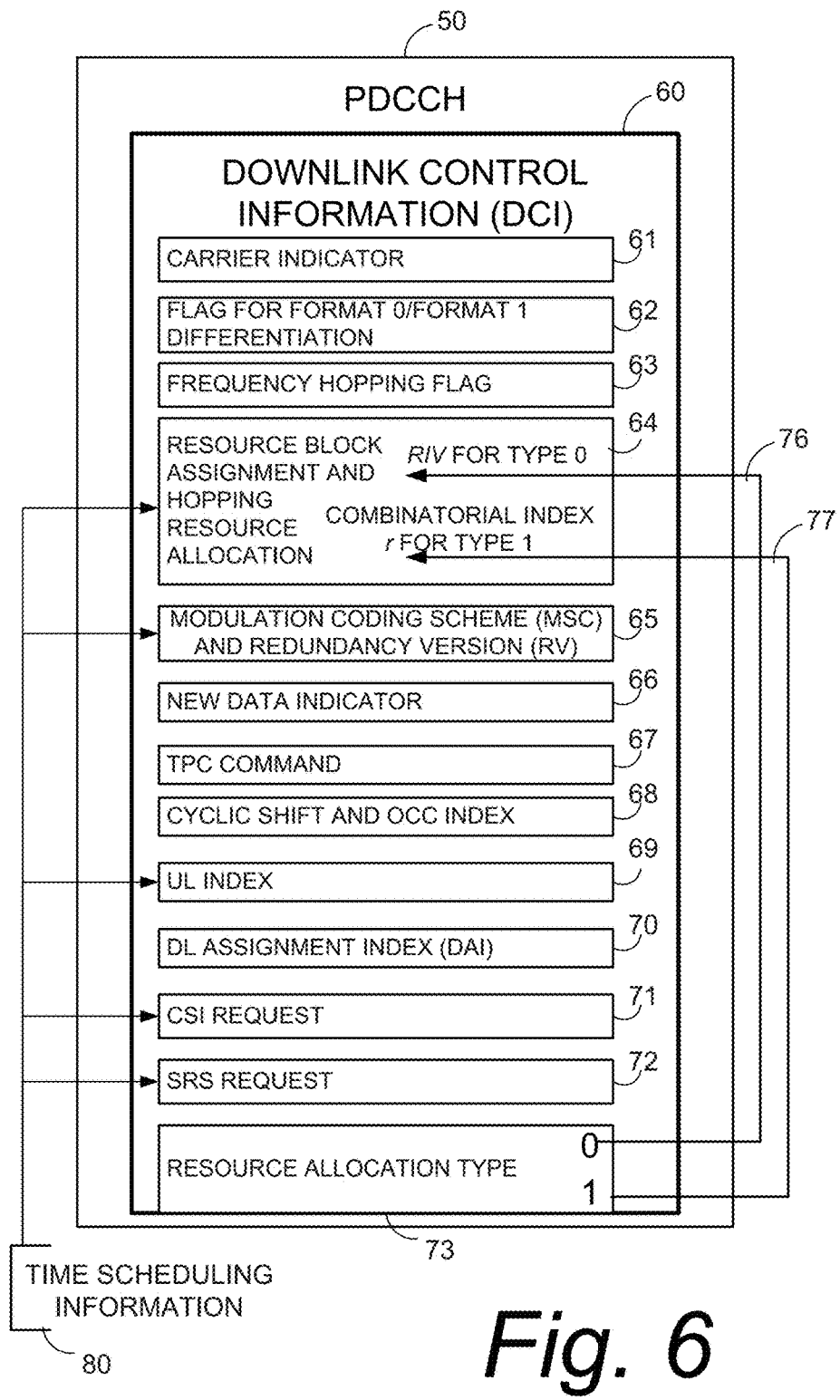
FIG. 6 is a diagrammatic view illustrating insertion of device-to-device (D2D) grant information into Downlink Control Information (DCI) of Physical Downlink Control Channel (PDCCH) according to an example embodiment and mode.

FIG. 6 diagrammatically illustrates Downlink Control Information (DCI) 60 as comprising various fields, all of which are understood from Third Generation Partners Project (3GPP) Technical Specification 36.212 Version 12.0.0 [$3^{rd}$ Generation Partnership Project, Technical Specification Group Radio Access Network; Evolved Universal Terrestrial Radio Access (E-UTRA); Multiplexing and channel coding (Release 12) (2013 December)], which is incorporated herein by reference in its entirety. See, e.g., section 5.3.3.1 et seq. of 3GPP Technical Specification 36.212 Version 12.0.0. DCI format 0 is used for the scheduling of PUSCH in one uplink (UL) cell.

Two resource allocation schemes Type 0 and Type 1 are supported for PDCCH/EPDCCH with uplink DCI format. If the resource allocation type bit is not present in the uplink DCI format, only resource allocation type 0 is supported. If the resource allocation type bit is present in the uplink DCI format, the selected resource allocation type for a decoded PDCCH/EPDCCH is indicated by a resource allocation type bit where type 0 is indicated by 0 value and type 1 is indicated otherwise. The wireless terminal shall interpret the resource allocation field depending on the resource allocation type bit in the PDCCH/EPDCCH with uplink DCI format detected.

The fields of Downlink Control Information (DCI) 60 illustrated in FIG. 6 are listed in Table 1 as follows:

TABLE 1

DCI FORMAT 1 FIELDS

| FIELD | DEFINITION |
|---|---|
| 61 | Carrier indicator - 0 or 3 bits |
| 62 | Flag for format0/format1A differentiation - 1 bit |
| 63 | Frequency hopping flag - 1 bit |
| 64 | Resource block assignment and hopping resource allocation - $\lceil \log_2(N_{RB}^{UL}(N_{RB}^{UL} + 1)/2) \rceil$ bits |
| 65 | Modulation and coding scheme and redundancy version - 5 bits |
| 66 | New data indicator - 1 bit |
| 67 | TPC command for scheduled PUSCH - 2 bits |
| 68 | Cyclic shift for DM RS and OCC index |
| 69 | UL index - 2 bits |
| 70 | Downlink Assignment Index (DAI) - 2 bits |
| 71 | CSI request - 1 or 2 bits |
| 72 | SRS request - 0 or 1 bit |
| 73 | Resource allocation type - 1 bit |

In an example embodiment node processor 30 is adapted to configure the resource block assignment field 64 of the Downlink Control Information (DCI) 60 to specify which resource blocks of a resource grid are to be used as the radio resources for the device-to-device (D2D) communication. When the resource allocation type field 73 of the DCI indicates a resource allocation type 0 as indicated by arrow 76 of FIG. 6, the node processor 30 configures the resource block assignment field 64 of the Downlink Control Information (DCI) 60 to comprise a resource indication value (RIV). On the other hand, when the resource allocation type field 73 indicates a resource allocation type 1 as indicated by arrow 77 of FIG. 6, the node processor 30 configures the resource block assignment field 64 of the Downlink Control Information (DCI) 60 to comprise a combinatorial index r from which can be determined two sets of resource blocks to be utilized for the D2D communication.

The terms resource indication value (RIV), contiguously allocated resource blocks ($L_{CRBs}$), and combinatorial index r are understood from 3GPP Technical Specification 36.213 Version 12.0.0 [$3^{rd}$ Generation Partnership Project; Technical Specification Group Radio Access Network; Evolved Universal Terrestrial Radio Access (E-UTRA); Physical layer procedures, (Release 12) (2013 December)], which is incorporated herein by reference in its entirety.

As mentioned above, when the resource allocation type field 73 of the DCI 60 indicates a resource allocation type 0, the resource block assignment field 64 comprises a resource indication value (RIV). The resource indication value (RIV) corresponds to a starting resource block and a length in terms of contiguously allocated resource blocks (LCRBs). More particularly, as stated in section 8.1.1 of 3GPP Technical Specification 36.213 Version 12.0.0:

The resource allocation information for uplink resource allocation type 0 indicates to a scheduled UE a set of contiguously allocated virtual resource block indices denoted by $n_{VRB}$. A resource allocation field in the scheduling grant consists of a resource indication value (RIV) corresponding to a starting resource block ($RB_{START}$) and a length in terms of contiguously allocated resource blocks ($L_{CRBs} \geq 1$). The resource indication value is defined by if $(L_{CRBs}-1) \leq \lfloor N_{RB}^{UL}/2 \rfloor$ then $RIV = N_{RB}^{UL}(L_{CRBs}-1) + RB_{START}$ else $RIV = N_{RB}^{UL}(N_{RB}^{UL} - L_{CRBs}+1)(N_{RB}^{UL}-1-RB_{START})$ As mentioned above, when the resource allocation type field 73 of the DCI 60 indicates a resource allocation type 1, the resource block assignment field 64 comprises combinatorial index r from which can be determined two sets of resource blocks to be utilized for the D2D communication. More particularly, as stated in section 8.1.2 of 3GPP Technical Specification 36.213 Version 12.0.0:

The resource allocation information for uplink resource allocation type 1 indicates to a scheduled UE two sets of resource blocks with each set including one or more consecutive resource block groups of size P as given in table 7.1.6.1-1 assuming $N_{RB}^{UL}$ as the system bandwidth. A combinatorial index r consists of $$\left\lceil \log_2 \left( \binom{\lceil N_{RB}^{UL}/P+1 \rceil}{4} \right) \right\rceil$$

bits. The bits from the resource allocation field in the scheduling grant represent r unless the number of bits in the resource allocation field in the scheduling grant is smaller than required to fully represent r, in which case the bits in the resource allocation field in the scheduling grant occupy the LSBs of r and the value of the remaining bits of r shall be assumed to be 0; or larger than required to fully represent r, in which case r occupies the LSBs of the resource allocation field in the scheduling grant.

The combinatorial index r corresponds to a starting and ending RBG index of resource block set 1, $s_0$ and $s_1-1$, and resource block set 2, $s_2$ and $s_3-1$ respectively, where r is given by equation $$r = \sum_{i=0}^{M-1} \binom{N-s_i}{M-i}$$

defined in subclause 7.2.1 with M=4 and $N=\lceil N_{RB}^{UL}/P \rceil +1$. Subclause 7.2.1 also defines ordering properties and range of values that $s_i$ (RBG indices) map to. Only a single RBG is allocated for a set at the starting RBG index if the corresponding ending RBG index equals the starting RBG index.

Whereas section 8.1.1 and section 8.1.2 of 3GPP Technical Specification 36.213 Version 12.0.0 refer to a number $N_{RB}^{UL}$ of allocated uplink resource blocks, the technology disclosed herein in lieu thereof uses $N_{RB}^{D2D}$ as a number of allocated D2D resource blocks for the device-to-device (D2D) grant 54. The parameter $N_{RB}^{D2D}$ is also known herein as the device-to-device (D2D) bandwidth parameter. In other words, in determining the expression of resource indication value (RIV) and the combinatorial r for device-to-device (D2D) grant 54, $N_{RB}^{D2D}$ is used in the expressions rather than $N_{RB}^{UL}$. The parameter $N_{RB}^{D2D}$ thus specifies the specific number of resource blocks available overall for device-to-device (D2D) communications. The parameter $N_{RB}^{D2D}$ may be pre-configured. In some example embodiments and mode the parameter $N_{RB}^{D2D}$ may be equal to (identical to) $N_{RB}^{UL}$. In other example embodiments and modes the parameter $N_{RB}^{D2D}$ may be smaller than $N_{RB}^{UL}$. In other example embodiments and modes the parameter $N_{RB}^{D2D}$ may a fraction of $N_{RB}^{UL}$, such as $N_{RB}^{UL}/x$, and x may be configurable by node 22.

The parameter $N_{RB}^{D2D}$, when communicated to both node 22 and first wireless terminal 26$_1$, enables the DCI formats used for uplink (UL) grants to be essentially "re-used" for device-to-device (D2D) grants, but with $N_{RB}^{UL}$ replaced by $N_{RB}^{D2D}$. The use of D2D grants inheriting the characteristics of uplink grants provides compatibility with the existing uplink (UL) physical, and thus simplifies implementation. The full flexibility of the DCI formats may be maintained and provides "future proofing" of the system for many in many out (MIMO) techniques.

From the foregoing it is seen that the Downlink Control Information (DCI) may be used to by a radio access node for device-to-device (D2D) scheduling. Therefore, in conjunction with previous discussion such the discussion of FIG. 3A and FIG. 3B it is understood that in accordance with the technology disclosed herein the radio access node may transmitting Downlink Control Information (DCI) on a Physical Downlink Control Channel (PDCCH) which specifies radio resources for transmission of a scheduling assignment and radio resources for transmission of device-to-device (D2D) data that is scheduled by the scheduling assignment for use by a first wireless terminal in D2D communication with a second wireless terminal. Similarly it is understood that the processor of the wireless terminal may be configured to obtain, from Downlink Control Information (DCI) on the Physical Downlink Control Channel (PD-CCH), radio resources for transmission of a scheduling assignment and radio resources for transmission of device-to-device (D2D) data that is scheduled by the scheduling assignment for use by the wireless terminal in performing device-to-device (D2D) communication with a second wireless terminal.

In addition, as another of its aspects the technology disclosed herein also provides signaling of time resources for D2D communication. In some example implementations the signaling of time resources for D2D communication may comprise, for example, a bitstring or bitmap which indicates for which subframes of a frame the device-to-device (D2D) communications applies. For example, in FIG. 5, time domain scheduling information comprises a bit string of "11100000", where '1' means allocation of subframe for device-to-device (D2D) communications. In other example implementations, the signaling of time resources may comprise one or more ordered pairs of fields, with the first field of each ordered pair indicating a start subframe in which the device-to-device (D2D) communications are authorized and the second field of each ordered pair indicating for how many consecutive subframes the device-to-device (D2D) communications applies (e.g., a duration of device-to-device (D2D) communications). In an example embodiment node processor 30 is adapted to configure one or more of the following fields of the Downlink Control Information (DCI) of FIG. 6 to include time domain scheduling information 80 for D2D communication: CSI request field 71, SRS request field 72, uplink index field 69, resource allocation field 64, and modulated and coding scheme (MSC)/redundancy version (RV) field 65.

Figure 7:
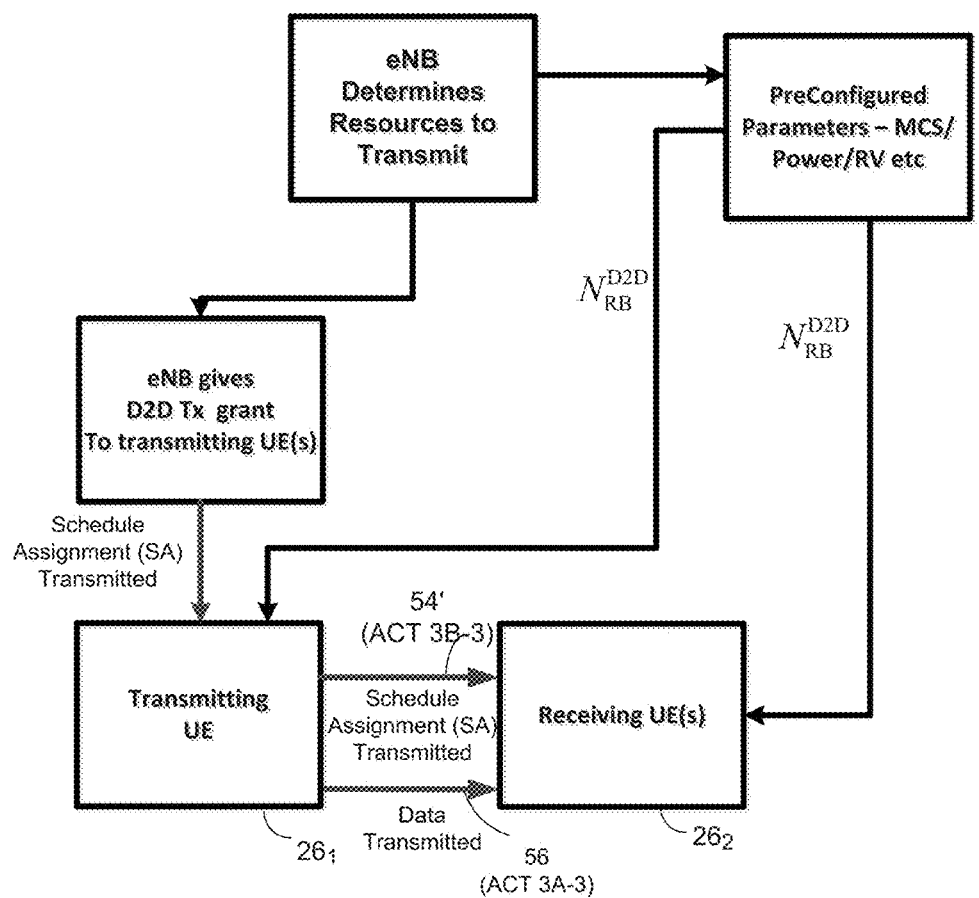
FIG. 7 is a diagrammatic view illustrating transmission of certain information among a network node, a first wireless terminal, and a second wireless terminal according to an example embodiment and mode.

FIG. 7 diagrammatically shows transmission of information among node 22, first wireless terminal $26_1$, and second wireless terminal $26_2$, including transmission of parameters such as $N_{RB}^{D2D}$, modulation and coding scheme (MCS), power, and redundancy version (RV); transmission of device-to-device (D2D) grant 54 from node 22 to first wireless terminal $26_1$; and transmission from first wireless terminal $26_1$ to second wireless terminal $26_2$ of modified device-to-device (D2D) grant 54' and device-to-device (D2D) data 56.

In the example embodiment basically illustrated by FIG. 1B, the node processor 30 is adapted to configure the physical downlink shared channel (PDSCH) to include the device-to-device (D2D) grant 54. In an example embodiment and mode, the node processor 30 is adapted to configure medium access control (MAC) control element 55 of the PDSCH 50'' to specify which resource blocks of a resource grid are to be used as the radio resources for the device-to-device (D2D) communication. That is, the medium access control (MAC) control element 55 of the PDSCH 50'' may carry values such as terms resource indication value (RIV), contiguously allocated resource blocks ($L_{CRBs}$), and combinatorial index r. MAC Control Element 55 used for D2D resource allocation may be identified in MAC header.

In the example embodiment of FIG. 1A the node processor 30 configures at least a portion of the Downlink Control Information (DCI) 60 to specify that the D2D grant is directed to a particular wireless terminal, e.g., to first wireless terminal $26_1$. In a particular implementation, node processor 30 is adapted to encode a cyclical redundancy check (CRC) portion of the Downlink Control Information (DCI) with a D2D radio network temporary identity (RNTI) of the wireless terminal to specify that the D2D grant is directed to the first wireless terminal.

Figure 8:
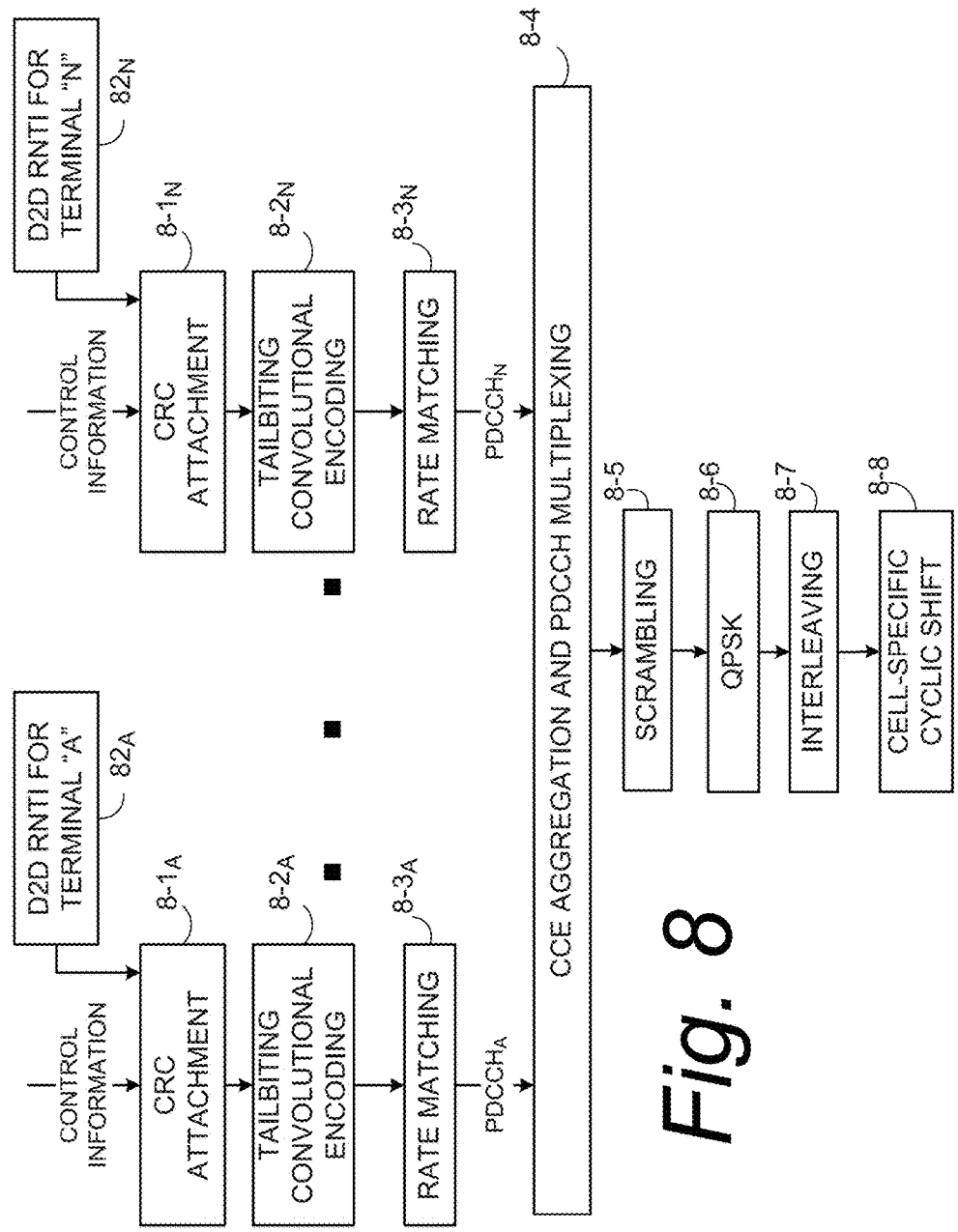
FIG. 8 is a diagrammatic view illustrating processing of certain aspects of L1/L2 control signaling includes processing acts for the Physical Downlink Control Channel (PDCCH) in which a device-to-device (D2D) grant is included.

FIG. 8 diagrammatic illustrates processing of certain aspects of L1/L2 control signaling, which includes processing acts for the Physical Downlink Control Channel (PD-CCH) 50' in which device-to-device (D2D) grant 54 is included. The processing of FIG. 8 can involve plural wireless terminals, e.g., wireless terminal A through wireless terminal N, and thus processing of plural Physical Downlink Control Channels (PDCCH), e.g., $PDCCH_A$ through $PDCCH_N$. The three acts of processing for each PDCCH are preformed individually for each wireless terminal. For wireless terminal A, act $8-1_A$ comprises CRC attachment, e.g., attachment of a cyclical redundancy check field to the Physical Downlink Control Channel (PDCCH) 50'. Act $8-2_A$ comprises applying a tail biting code (e.g., tail-biting convolutional encoding). Act $8-3_A$ comprises rate matching to yield $PDCCH_A$ for wireless terminal A. Comparable act $8-1_N$ through act $8-3_N$ are performed for wireless terminal N, to yield $PDCCH_N$ for wireless terminal N. Act 8-4 comprises CCE aggregation and PDCCH multiplexing, it being understood that multiple Physical Downlink Control Channels (PDCCHs), e.g., $PDCCH_A$ through $PDCCH_N$, may be included in a particular control region. Act 8-5 comprises scrambling. Act 8-6 comprises QPSK. Act 8-7 comprises interleaving. Act 8-8 comprises cell-specific cyclic shifting.

In conjunction with act 8-1A and act 8-1N the L1/L2 processing/processor attaches a cyclical redundancy check (CRC) to each DCI message payload (e.g., Downlink Control Information (DCI) 60). The identity of the terminal addressed, e.g., whether wireless terminal A or wireless terminal N, is included in the CRC calculation and thus not explicitly transmitted as a separate field. Depending on the purpose of the DCI message, different radio network temporary identities (RNTIs) are used for encoding the CRC for the target wireless terminal. Thus, each wireless terminal may have a set of RNTIs. A feature of the technology disclosed herein is provision of a device-to-device (D2D) RNTI (D2D RNTI) for encoding a Physical Downlink Control Channel (PDCCH) which includes a device-to-device (D2D) grant 54. Accordingly, FIG. 8 shows D2D RNTI $82_A$ for wireless terminal A being involved in the CRC attachment act $8-1_A$, and D2D RNTI $82_N$ for wireless terminal N being involved in the CRC attachment act $8-1_N$.

As mentioned above, first wireless terminal $26_1$ comprises terminal processor 40 and terminal transceiver 42. The terminal transceiver 42 preferably comprises terminal transmitter section 44 (e.g., terminal transmitter circuitry or "transmitter") and terminal receiver section 46 (e.g., terminal receiver circuitry or "receiver"). The receiver 46 of first wireless terminal 26$_1$ receives subframe S communicated over radio interface 24 from communications system 20, as indicated by arrow 3A-2, previously discussed. The terminal processor 40 detects or obtains from the channel 50 of subframe S the device-to-device (D2D) grant 54. As already mentioned, device-to-device (D2D) grant 54 specifies radio resources that first wireless terminal 26$_1$ is permitted to use for device-to-device (D2D) communication with another wireless terminal, e.g., second wireless terminal 26$_2$. The transmitter 44 of first wireless terminal 26$_1$ serves, e.g., to transmit data on the uplink (UL) from first wireless terminal 26$_1$ to node 22, but also serves to transmit device-to-device (D2D) data to another wireless terminal(s), e.g., second wireless terminal 26$_2$, using the radio resources permitted by the D2D grant 54.

In the above regard, in conjunction with the example embodiment of FIG. 1A in which the channel 50 is the PDCCH, it will be appreciated that terminal processor 40 obtains, from a resource block assignment field 64 of the Downlink Control Information (DCI) 60, which resource blocks of a resource grid are to be used as the radio resources for the device-to-device (D2D) communication, as previously discussed, e.g., in conjunction with FIG. 6, and to obtain the appropriate information therefrom. For example, when the resource allocation type field 73 of the DCI 60 indicates a resource allocation type 0, the terminal processor 40 obtains from the resource block assignment field 64 of the Downlink Control Information (DCI) 60 a resource indication value (RIV). On the other hand, when the resource allocation type field 73 indicates a resource allocation type 1, the terminal processor 40 obtains from the resource block assignment field 64 of the Downlink Control Information (DCI) 60 a combinatorial index r from which can be determined two sets of resource blocks to be utilized for the D2D communication. Moreover, the terminal processor 40 can also discern the time domain scheduling information 80, as previously described with reference to FIG. 6.

The terminal processor 40 is also configured to detect from at least a portion of the Downlink Control Information (DCI) that the D2D grant is directed to the first wireless terminal. In an example implementation, as understood from the discussion of FIG. 8, terminal processor 40 is configured to detect from a cyclical redundancy check (CRC) portion of the Downlink Control Information (DCI) encoded with a D2D radio network temporary identity (RNTI) of the wireless terminal that the D2D grant is directed to first wireless terminal 26$_1$. A bit length of DCI format to be used for the D2D grant is the same bit length of one or more of the DCI formats for wide area network (WAN) communication (e.g., DCI format 0). The DCI format to be used for the D2D grant is shared with one or more of the DCI formats for wide area network (WAN) communication (e.g., DCI format 0).

FIG. 9 shows in more detail an example embodiment of the radio communications network of FIG. 1A. It should be appreciated that FIG. 9 is just one example implementation of how the node 22 and first wireless terminal 26$_1$ may be carried out structurally and/or functionally. The FIG. 1A (encompassing FIG. 9B) and the FIG. 1B example embodiments are preferably implemented using electronic machinery. The node 22 comprises node electronic machinery 86; first wireless terminal 26$_1$ comprises terminal electronic machinery 88. In FIG. 1A, FIG. 1B, and FIG. 9, various units and functionalities as framed by broken lines of node 22 and first wireless terminal 26$_1$ are implemented by node electronic machinery 86 and terminal electronic machinery 88, respectively. What comprises node "electronic machinery" is discussed in more detail with reference to FIG. 10.

In the example embodiment of FIG. 9 the node 22 comprises node processor 30, also known as a frame processor, and node transmitter 32. The node transmitter 32 typically includes plural antenna 32A. The node processor 30 is shown in more detail as comprising node scheduler 100 and node frame handler 104. In essence, the node scheduler 100 prepares or formats, into frames, information to be transmitted by node transmitter 32 on the downlink (DL) from node 22 to first wireless terminal 26$_1$ (as well as to other wireless terminals). The node scheduler 100 comprises D2D grant unit 106, which serves to prepare the device-to-device (D2D) grant 54 for inclusion in the Physical Downlink Control Channel (PDCCH) 50'. The node frame handler 104 serves, e.g., to process information received in frames on the uplink from wireless terminals, e.g., first wireless terminal 26$_1$.

The node 22 of FIG. 9 also includes device-to-device (D2D) controller 110 and RNTI memory 112, as well as L1/L2 control signal processor 114. The L1/L2 control signal processor 114 in turn comprises CRC attachment unit 116. The D2D controller 110 keeps track of interaction of the access node with wireless terminals, which includes determining which radio resources are eligible for or are included in a D2D resource pool for potential use in conjunction with D2D grants. The L1/L2 control signal processor 114 performs operations such as those previously described with reference to FIG. 8. The CRC attachment unit 116 in particular encodes the CRC for a Physical Downlink Control Channel (PDCCH) with the D2D RNTI of the particular wireless terminal to which the device-to-device (D2D) grant 54 is addressed. The CRC attachment unit 116 thus has access to RNTI memory 112 so that CRC attachment unit 116 may obtain the D2D RNTI for the wireless terminal to which the device-to-device (D2D) grant 54 is to be addressed, and encode the CRC for that Physical Downlink Control Channel (PDCCH) 50' with the thusly obtained D2D RNTI.

The first wireless terminal 26$_1$ comprises terminal processor 40 and terminal transceiver 42. The terminal transceiver 42 typically includes plural antenna 42A. The terminal processor 40 of first wireless terminal 26$_1$ of FIG. 9, also known as a frame processor, comprises terminal scheduler 120 and terminal decoder 122. The terminal decoder 122 analyzes a downlink (DL) portion of a frame as received over radio interface 24 from node 22. Grant decode unit 124 of terminal decoder 122 analyzes the control region of the subframe and particularly the Physical Downlink Control Channel (PDCCH) 50' in order to obtain the device-to-device (D2D) grant 54. The terminal scheduler 120 comprises D2D grant unit 126 and D2D data unit 128. The D2D grant unit 126 prepares device-to-device (D2D) grant 54' for transmission by terminal transmitter section 44 in a subframe such as subframe S$_G$ of FIG. 4 to second wireless terminal 26$_2$ as act 3B-3 of FIG. 3B and FIG. 4. The D2D data unit 128 processes D2D data which will be used as device-to-device (D2D) data 56 transmitted in one or more subframe(s) S$_1$ by terminal transmitter section 44 to second wireless terminal 26$_2$ as shown by act 3A-3 of FIG. 3A and FIG. 4.

The first wireless terminal 26$_1$ also comprises terminal D2D controller 130; terminal RNTI memory 132; plural executable applications 134; and one or more user interfaces (GUIs) 136. The user interfaces (GUIs) 136 may be used to operate or interact with one or more of the executable applications 134. One or more of the applications 134, when executed, may prompt or involve device-to-device (D2D) communications with another wireless terminal, e.g., second wireless terminal 26$_2$. When device-to-device (D2D) communications are invoked or initiated by an application, terminal D2D controller 130 superintends or controls the device-to-device (D2D) communications. Among the activities performed by executable applications 134 are initiating the sending of scheduling requests and buffer status reports to node 22, as well as interacting with D2D grant unit 126 for sending a device-to-device (D2D) grant 54' and interacting with D2D data unit 128 for sending device-to-device (D2D) data 56 to second wireless terminal 26$_2$.

The terminal RNTI memory 132 of first wireless terminal 26$_1$ stores the device-to-device (D2D) RNTI, among other RNTIs associated with first wireless terminal 26$_1$, so that the device-to-device (D2D) RNTI may be used for decoding the CRC portion of an incoming Downlink Control Information (DCI) 60 and thereby determining whether the device-to-device (D2D) grant 54 thereof is addressed to first wireless terminal 26$_1$. The manner of decoding is understood to be essentially the reverse of the encoding operation described above with respect to act 8-1. The terminal RNTI memory 132 may also includes D2D RNTI addresses for other wireless terminals, e.g., second wireless terminal 26$_2$, to whom the first wireless terminal 26$_1$ may address device-to-device (D2D) grant 54'.

Figure 10:
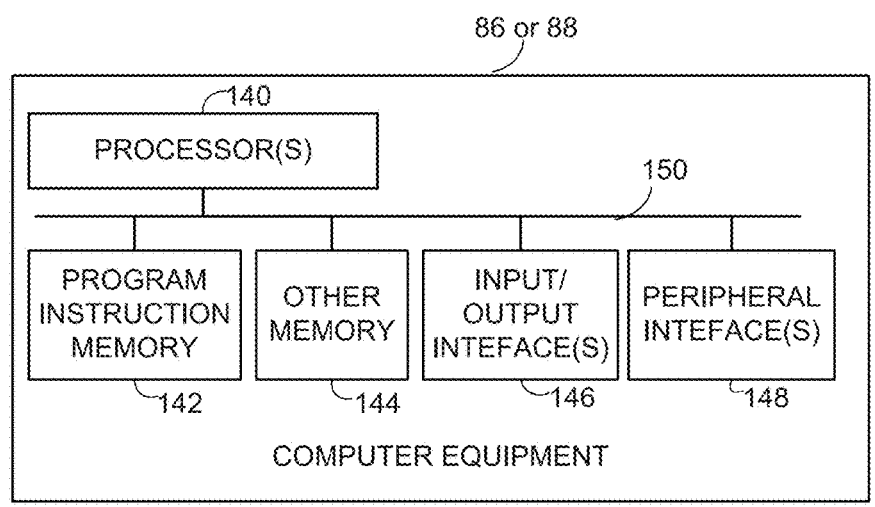
FIG. 10 is a schematic view showing aspects of electronic machinery that may comprise a node or a wireless terminal according to an example embodiment.
Figure 11:
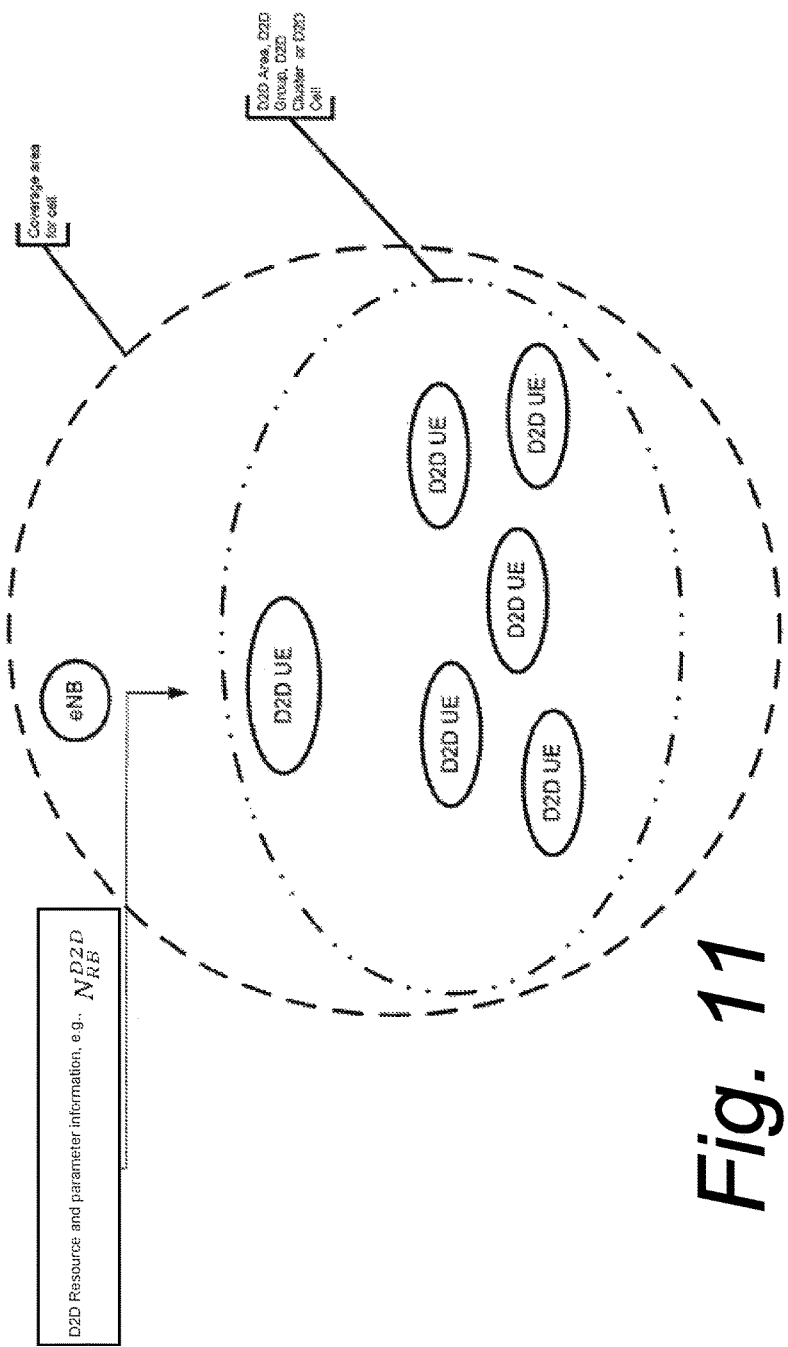
FIG. 11 is a diagrammatic view illustrating D2D capable wireless terminals, including some D2D wireless terminals under network control.

It was mentioned above that certain units and functionalities of node 22 framed by broken line are, in an example embodiment, implemented by node electronic machinery 86. Similarly, certain units and functionalities of first wireless terminal 26$_1$ framed by broken line are, in an example embodiment, implemented by terminal electronic machinery 88. FIG. 10 shows an example of such electronic machinery, whether node electronic machinery 86 or terminal electronic machinery 88, as comprising one or more processors 140, program instruction memory 142; other memory 144 (e.g., RAM, cache, etc.); input/output interfaces 146; peripheral interfaces 148; support circuits 149; and busses 150 for communication between the aforementioned units.

The memory 144, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 149 are coupled to the processors 140 for supporting the processor in a conventional manner. These circuits include cache, power supplies, clock circuits, input/output circuitry and subsystems, and the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

In an example embodiment, other than content of the D2D grant, the Downlink Control Information (DCI) and the Physical Downlink Control Channel (PDCCH) is formatted in accordance with Third Generation Partners Project (3GPP) Technical Specification 36.212 Version 12.0.0.

Aspects of the technology disclosed herein facilitate reuse the existing schedule assignment methodology for device-to-device (D2D) communications. The technology disclosed herein enables existing signaling methodologies of the WAN to be reused, and introduces a parameter ($N_{RB}^{D2D}$) describing the D2D resource region. Introduction of the device-to-device (D2D) bandwidth parameter $N_{RB}^{D2D}$ enables flexibility of Downlink Control Information (DCI) formats to be retained, and yet the structure of the previous LTE industry standard specifications, including those aforementioned, may be maintained.

The technology disclosed herein also re-purposes a Carrier Indication Field (CIF) in DCI in the Physical Downlink Control Channel (PDCCH) or enhanced PDCCH (EPD-CCH) to indicate which device to device communication might take place. A Carrier Indication Field (CIF) in DCI may indicate a uplink component carrier which corresponds to a D2D grant.

According to the technology disclosed herein, mapping of resources for transmission may be made either corresponding to actual resource blocks (a set of resource elements) for transmission or to virtual resource blocks for transmission which are further mapped to a set of actual resource blocks.

The technology disclosed herein enables operators a reasonable measure of control over the D2D spectrum, and also allocate time/frequency resources flexibly yet in a manner that is not inconsistent with 3GPP LTE industry standards.

As understood from the foregoing, aspects of the technology disclosed herein facilitate resource allocation for Scheduling Assignment information for D2D following a similar method as occurs for scheduling UL grants for WAN. However, considering limited D2D resource compared to WAN resource, the technology disclosed herein provides the option of reducing the number of bits for frequency domain resource allocation for D2D. For example, as mentioned above, the uplink parameter $N_{RB}^{UL}$ may be replaced by the technology disclosed herein with the device-to-device (D2D) bandwidth parameter $N_{RB}^{D2D}$. In some example implementations the device-to-device (D2D) bandwidth parameter $N_{RB}^{D2D}$ may be smaller than the uplink parameter $N_{RB}^{UL}$.

For another example, in type 0 resource allocation, a length in terms of contiguously allocated resource blocks (LCRBs≥1) may be limited to a value Y. The value Y may be, for example, 1, 2, $N_{RB}^{UL}/m$, etc. (wherein m is a non-zero integer greater than 1). By limiting possible maximum size of L CRBS, the Resource block assignment and hopping resource allocation $[\log_2(N_{RB}^{UL}(N_{RB}^{UL}+1)/2)]$ bits may be reduced to $[\log_2(L_{CRBs}^{max}(N_{RB}^{UL}+1)/2)]$ bits. As understood with reference to, e.g., FIG. 6, remaining bits of "resource block assignment and hopping resource allocation" field 64, CSI request field, and/or other fields including the modulation and coding scheme and redundancy version field 65 may be used for time domain scheduling information. For example, scheduling assignment (SA) time and/or frequency resources may be configured by dedicated radio resource control (RRC) signaling or broadcasted system information. Scheduling Assignment (SA) resource pool may be configured by radio resource control (RRC). As described above, SA transmission resource may be dynamically assigned to the transmitting wireless terminal. For time domain, a periodicity of SA resource(s) or SA resource pool is configured. Allocation interval (scheduling period) of D2D data transmission may be one or multiple of the periodicity of SA resource (s) or SA resource pool. The time domain scheduling information in DCI for D2D grant may depend on the periodicity of SA resource (s) or SA resource pool.

The technology disclosed herein thus provides a DCI format for D2D grant which includes Scheduling assignment information as described in conjunction with FIG. 1A for example, but it is not limited to a use of DCI of PDCCH. Instead of using PDCCH, scheduling assignment information may be delivered by a medium access control (MAC) control element 55 in the PDSCH from the node 22 to the transmitting wireless terminal, e.g., to first wireless terminal 261. Also, the transmitting wireless terminal such as first wireless terminal 261 may transmit scheduling assignment (SA) through a comparable MAC Control Element on PUSCH to a receiver wireless terminal, such as second wireless terminal 262.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Some the terminology employed for concepts as described herein has been updated or changed in more recent industry documentation, such as the 3GPP Technical Standards, for example. As mentioned above, "device-to-device (D2D)" is now also called "sidelink direct". Some other terminology has also changed, a partial listing appearing in Table 2 below.

TABLE 2

Terminology

| Previous Terminology | New Terminology |
| --- | --- |
| Schedule assignment SA | PSCCH Physical Sidelink Control Channel |
| PD2DSCH (Phys. D2D Synch. Channel) | PSBCH (Phys. Sidelink Broadcast Channel) |
| D2DSS (D2D synchronization signals) | SLSS (Sidelink Synchronization Signals) |
| D2D Communications or Data Channel | PSSCH (Physical Sidelink Shared Channel) |
| D2D Discovery Channel | DSDCH |

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method performed by a radio access node, the method comprising:
   the radio access node transmitting Downlink Control Information (DCI) on a Physical Downlink Control Channel (PDCCH) which specifies
   (i) radio resources for transmission of a scheduling assignment that is transmitted from a first wireless terminal to a second wireless terminal; and
   (ii) radio resources for transmission of device-to-device (D2D) data that is scheduled by the scheduling assignment for use by the first wireless terminal in D2D communication with the second wireless terminal; and the radio access node encoding a cyclical redundancy check (CRC) portion of the DCI with a D2D radio network temporary identity (RNTI) of the first wireless terminal.

2. The method of claim 1, wherein a length of DCI format to be used for the D2D grant is the same length of DCI format 0 for wide area network (WAN) communication.

3. The method of claim 1, further comprising providing the first wireless terminal with a D2D bandwidth parameter $N_{RB}^{D2D}$ which specifies a number of resource blocks of a resource grid which are available for D2D communication.

4. The method of claim 1, further comprising the radio access node providing the first wireless terminal with a Scheduling Assignment resource parameter which specifies a resource offset value which specifies a starting position of a scheduling assignment resource pool.

5. A method performed by a wireless terminal, the method comprising:
- the wireless terminal receiving Downlink Control Information (DCI) on a Physical Downlink Control Channel (PDCCH) which specifies
  (i) radio resources for transmission of a scheduling assignment that is transmitted from a first wireless terminal to a second wireless terminal
  (ii) and radio resources for transmission of device-to-device (D2D) data that is scheduled by the scheduling assignment;
- the first wireless terminal performing transmission of the scheduling assignment to the second wireless terminal using the specified radio resources for transmission of the scheduling assignment; and
- the first wireless terminal performing transmission of the D2D data to the second wireless terminal using the specified radio resources for transmission of the D2D data.

6. The method of claim 5, further comprising the wireless terminal decoding its D2D radio network temporary identity (RNTI) from a cyclical redundancy check (CRC) portion of the DCI.

7. The method of claim 5, wherein the length of DCI format used for the D2D grant is the same length of DCI format 0 for wide area network (WAN) communication.

8. The method of claim 5, further comprising the wireless terminal obtaining a D2D bandwidth parameter $N_{RB}^{D2D}$ which specifies a number of resource blocks of a resource grid which are available for D2D communication.

9. The method of claim 5, further comprising the wireless terminal obtaining a Scheduling Assignment resource parameter which specifies a resource offset value which specifies a starting position of a scheduling assignment resource pool.

10. A radio access node of a communications network comprising:
- a processor configured:
  - to generate Downlink Control Information (DCI) on the Physical Downlink Control Channel (PDCCH) which specifies
    (i) radio resources for transmission of a scheduling assignment that is transmitted from a first wireless terminal to a second wireless terminal and
    (ii) radio resources for transmission of device-to-device (D2D) data that is scheduled by the scheduling assignment for use by the first wireless terminal for device-to-device (D2D) communication with the second wireless terminal;
  - to encode a cyclical redundancy check (CRC) portion of the Downlink Control Information (DCI) with a D2D radio network temporary identity (RNTI) of the first wireless terminal to specify that the D2D grant is directed to the first wireless terminal;
- a transmitter adapted to transmit the DCI to the first wireless terminal over a radio interface.

11. The radio access node of claim 10, wherein a length of DCI format to be used for the D2D grant is the same length of DCI format 0 for wide area network (WAN) communication.

12. The radio access node of claim 10, wherein the processor is adapted to provide the first wireless terminal with a D2D bandwidth parameter $N_{RB}^{D2D}$ which specifies a number of resource blocks of a resource grid which are available for D2D communication.

13. The radio access node of claim 10, wherein the processor is adapted to provide the first wireless terminal with a Scheduling Assignment resource parameter which specifies a resource offset value which specifies a starting position of a scheduling assignment resource pool.

14. A wireless terminal comprising:
- a receiver configured to receive a Physical Downlink Control Channel (PDCCH) over a radio interface;
- a processor configured to obtain Downlink Control Information (DCI) on the Physical Downlink Control Channel (PDCCH) which specifies
  (i) radio resources for transmission of a scheduling assignment that is transmitted from a first wireless terminal to a second wireless terminal and
  (ii) radio resources for transmission of device-to-device (D2D) data that is scheduled by the scheduling assignment for use by the first wireless terminal in performing device-to-device (D2D) communication with the second wireless terminal; and
- a transmitter configured to perform transmission of the scheduling assignment to the second wireless terminal using the specified radio resources for transmission of the scheduling assignment and perform transmission of the D2D data to the second wireless terminal using the specified radio resources for transmission of the D2D data.

15. The wireless terminal of claim 14, wherein the processor is configured to determine from a cyclical redundancy check (CRC) portion of the DCI encoded with a D2D radio network temporary identity (RNTI) of the wireless terminal.

16. The wireless terminal of claim 14, wherein the length of DCI format used for the D2D grant is the same length of DCI format 0 for wide area network (WAN) communication.

17. The wireless terminal of claim 14, wherein the processor is configured with a D2D bandwidth parameter $N_{RB}^{D2D}$ which specifies a number of resource blocks of a resource grid which are available for D2D communication.

18. The wireless terminal of claim 14, wherein the processor is configured with a Scheduling Assignment resource parameter which specifies a resource offset value which specifies a starting position of a scheduling assignment resource pool.

19. A method in a wireless terminal comprising:
- receiving a Physical Downlink Control Channel (PDCCH) over a radio interface;
- obtaining Downlink Control Information (DCI) on the Physical Downlink Control Channel (PDCCH) which specifies
  (i) radio resources for transmission of a scheduling assignment that is transmitted from a first wireless terminal to a second wireless terminal and
  (ii) radio resources for transmission of device-to-device (D2D) data that is scheduled by the scheduling assignment for use by the first wireless terminal in performing device-to-device (D2D) communication with the second wireless terminal;

performing transmission of the scheduling assignment to the second wireless terminal using the specified radio resources for transmission of the scheduling assignment; and performing transmission of the D2D data to the second wireless terminal using the specified radio resources for transmission of the D2D data.

20. The method of claim 19, further comprising determining from a cyclical redundancy check (CRC) portion of the DCI encoded with a D2D radio network temporary identity (RNTI) of the wireless terminal.

21. The method of claim 19, wherein the length of DCI format used for the D2D grant is the same length of DCI format 0 for wide area network (WAN) communication.

* * * * *